US012702926B2

(12) United States Patent
Lee

(10) Patent No.: US 12,702,926 B2
(45) Date of Patent: Aug. 11, 2026

(54) METAVERSE SYSTEM FOR PROVIDING ECONOMIC MANAGEMENT SYSTEM TO CONVERGENCE SPACE IN WHICH REAL WORLD AND VIRTUAL WORLD ARE CONVERGED

(71) Applicant: Sang Yeol Lee, Bucheon-si (KR)

(72) Inventor: Sang Yeol Lee, Bucheon-si (KR)

( * ) Notice: Subject to any disclaimer, the term of this patent is extended or adjusted under 35 U.S.C. 154(b) by 371 days.

(21) Appl. No.: 18/287,653

(22) PCT Filed: Aug. 11, 2021

(86) PCT No.: PCT/KR2021/010693
§ 371 (c)(1),
(2) Date: Oct. 20, 2023

(87) PCT Pub. No.: WO2022/225103
PCT Pub. Date: Oct. 27, 2022

(65) Prior Publication Data
US 2024/0181349 A1 Jun. 6, 2024

(30) Foreign Application Priority Data
Apr. 23, 2021 (KR) ........................ 10-2021-0053155
Jul. 30, 2021 (KR) ........................ 10-2021-0100799

(51) Int. Cl.
*A63F 13/65* (2014.01)
*A63F 13/216* (2014.01)
(Continued)

(52) U.S. Cl.
CPC ............ *A63F 13/65* (2014.09); *A63F 13/216* (2014.09); *A63F 13/35* (2014.09); *A63F 13/79* (2014.09);
(Continued)

(58) Field of Classification Search
CPC ........ A63F 13/65; A63F 13/216; A63F 13/35; A63F 13/79; A63F 2300/8082; G06Q 30/0643; G06Q 50/10
See application file for complete search history.

(56) References Cited

U.S. PATENT DOCUMENTS 6,085,976 A * 7/2000 Sehr ........................ G07B 15/00
235/492
2018/0272235 A1* 9/2018 Lee ........................ A63F 13/69
(Continued)

FOREIGN PATENT DOCUMENTS

JP 2019-530932 A 10/2019
KR 10-2011-0054493 5/2011
(Continued)

OTHER PUBLICATIONS

English Specification of 10-2014-0036555.
(Continued)

*Primary Examiner* — Kevin Y Kim
(74) *Attorney, Agent, or Firm* — ANTONIO HA & U.S. PATENT, LLC

(57) ABSTRACT

A metaverse system for providing an economic management system to a convergence space in which the real world and a virtual world are converged according to an embodiment of the present invention comprises: a user terminal for executing a metaverse game supporting an avatar configured by a user and a convergence economy service, by which an economic activity is performed in a convergence space where a virtual world in which the avatar is active and the real world are converged; and a metaverse game server for providing information accompanying the movement and transaction of the avatar in the convergence space as convergence information obtained through convergence of a virtual world and the real world, and providing a metaverse
(Continued)

game in which a result according to a transaction action of the avatar is reflected in a convergence economy.

19 Claims, 28 Drawing Sheets

(51) Int. Cl.
*A63F 13/35* (2014.01)
*A63F 13/79* (2014.01)
*G06Q 30/0601* (2023.01)

(52) U.S. Cl.
CPC .. *G06Q 30/0643* (2013.01); *A63F 2300/8082* (2013.01)

(56) References Cited

U.S. PATENT DOCUMENTS

2018/0342106 A1* 11/2018 Rosado ................ G06Q 10/109
2019/0045207 A1* 2/2019 Chen ........................ G06N 3/08

FOREIGN PATENT DOCUMENTS

KR 10-2013-0068593 6/2013
KR 10-2014-0036555 3/2014
KR 10-2018-0080934 7/2018
KR 10-2122563 6/2020

OTHER PUBLICATIONS

English Specification of JP2019-530932A.
English Specification of 10-2011-0054493.
English Specification of 10-2018-0080934.
English Specification of 10-2122563.
English Specification of 10-2013-0068593.
Go, Seon-Yeong et al. Concept and Development Direction of Metaverse. Korea Information Processing Society Review, vol. 28, No. 1, pp. 7-16, Mar. 2021.
Han, Mi-Kyong et al. An Assisted Living Support Service System using the Metaverse Client in a Smart Home. Proceedings of the Institute of Electronics and Information Engineers Summer Annual Conference 2015, pp. 1468-1471, Jun. 2015.
English translation of "Go, Scon-Yeong et al. Concept and Development Direction of Metaverse. Korca Information Processing Society Review, vol. 28, No. 1, pp. 7-16, Mar. 2021".
English translation of "Han, Mi-Kyong et al. An Assisted Living Support Service System using the Metaverse Client in a Smart Home. Proceedings of the Institute of Electronics and Information Engineers Summer Annual Conference 2015, pp. 1468-1471, Jun. 2015".

* cited by examiner

Figure 7:
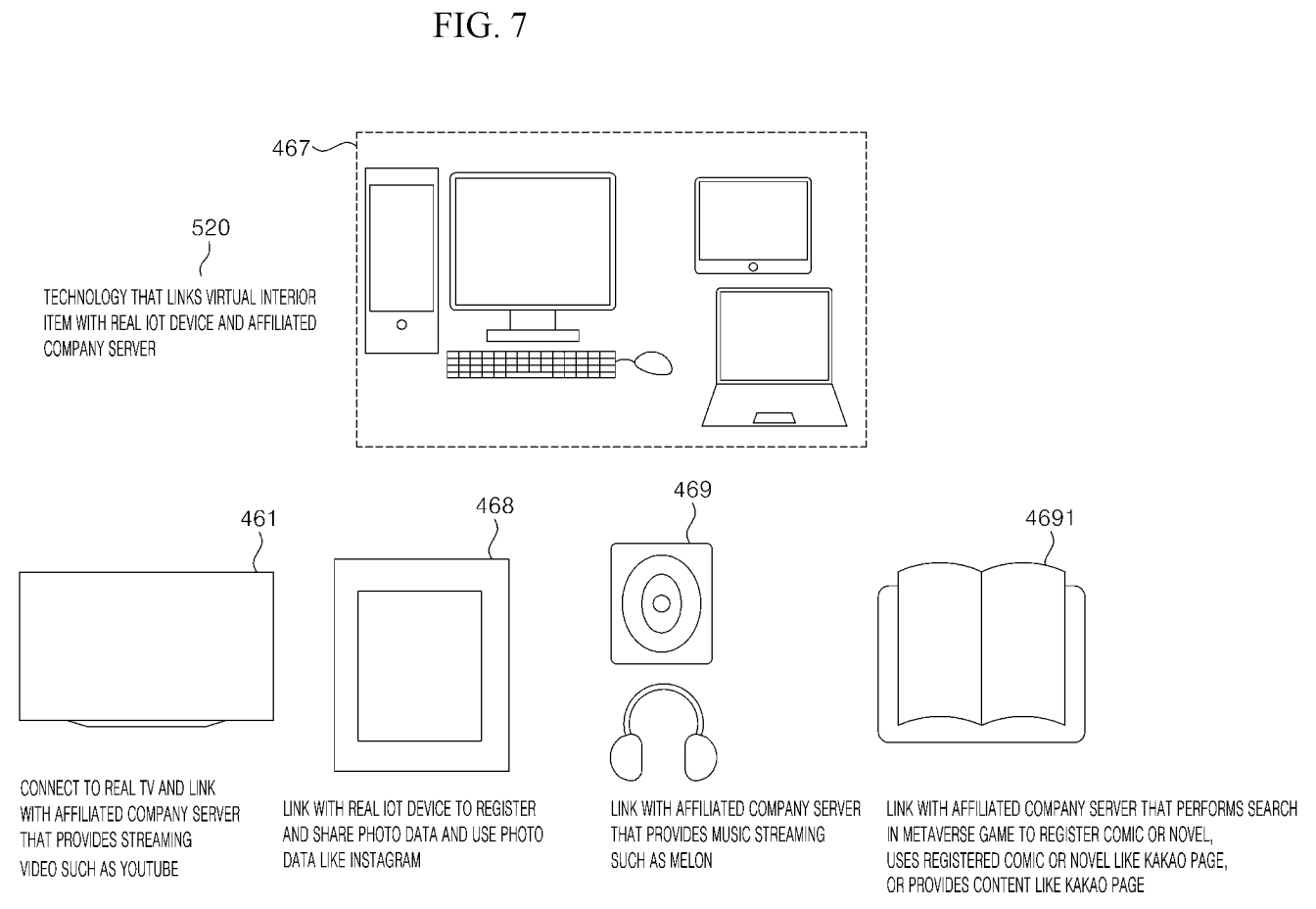

TECHNOLOGY THAT LINKS VIRTUAL INTERIOR ITEM WITH REAL IOT DEVICE AND AFFILIATED COMPANY SERVER

467

461

CONNECT TO REAL TV AND LINK WITH AFFILIATED COMPANY SERVER THAT PROVIDES STREAMING VIDEO SUCH AS YOUTUBE

468

LINK WITH REAL IOT DEVICE TO REGISTER AND SHARE PHOTO DATA AND USE PHOTO DATA LIKE INSTAGRAM

469

LINK WITH AFFILIATED COMPANY SERVER THAT PROVIDES MUSIC STREAMING SUCH AS MELON

4691

LINK WITH AFFILIATED COMPANY SERVER THAT PERFORMS SEARCH IN METAVERSE GAME TO REGISTER COMIC OR NOVEL, USES REGISTERED COMIC OR NOVEL LIKE KAKAO PAGE, OR PROVIDES CONTENT LIKE KAKAO PAGE

FIG. 8

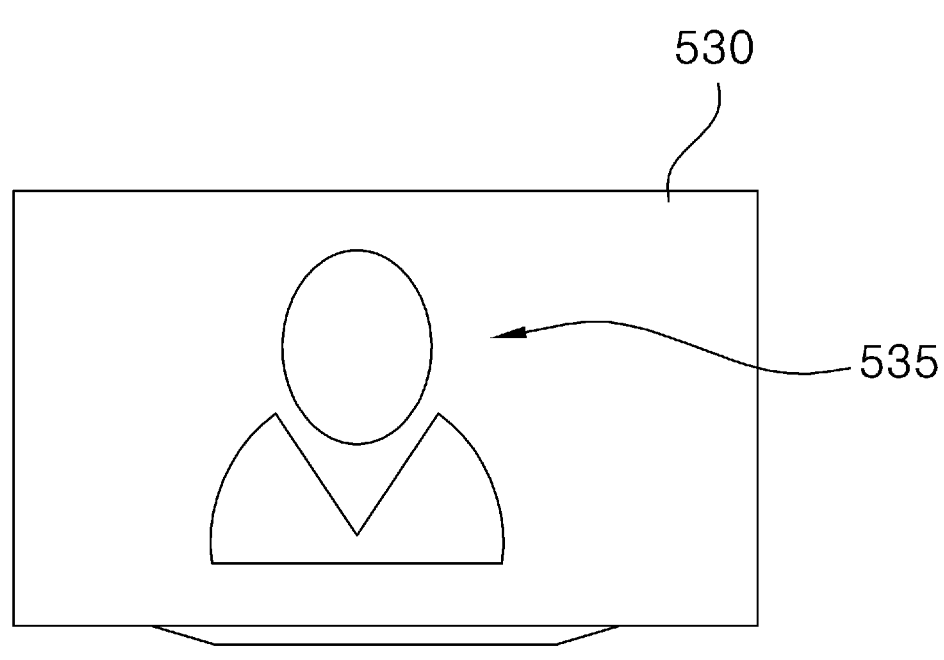

WHEN USER PURCHASES CHARACTER FROM ITEM UNIT AND COMBINES PURCHASED CHARACTER WITH CHARACTER APPEARING IN STREAMING VIDEO USING DEEPFAKE TECHNOLOGY, USER CAN WATCH STREAMING VIDEO SUCH AS WEATHER, NEWS, ENTERTAINMENT, DRAMA, AND MOVIE THAT HIS/HER DESIRED CHARACTER INTRODUCES

IN ADDITION, WHEN VISUALLY IMPAIRED USER PURCHASES VOICE IN ITEM UNIT AND USES TEXT CONTENT PROVIDED BY METAVERSE GAME SERVER, BUSINESS OPERATOR SERVER, OR AFFILIATED COMPANY SERVER, IT IS ALSO POSSIBLE TO PROVIDE SERVICE IN WHICH PURCHASED VOICE READS SELECTED TEXT

FIG. 12

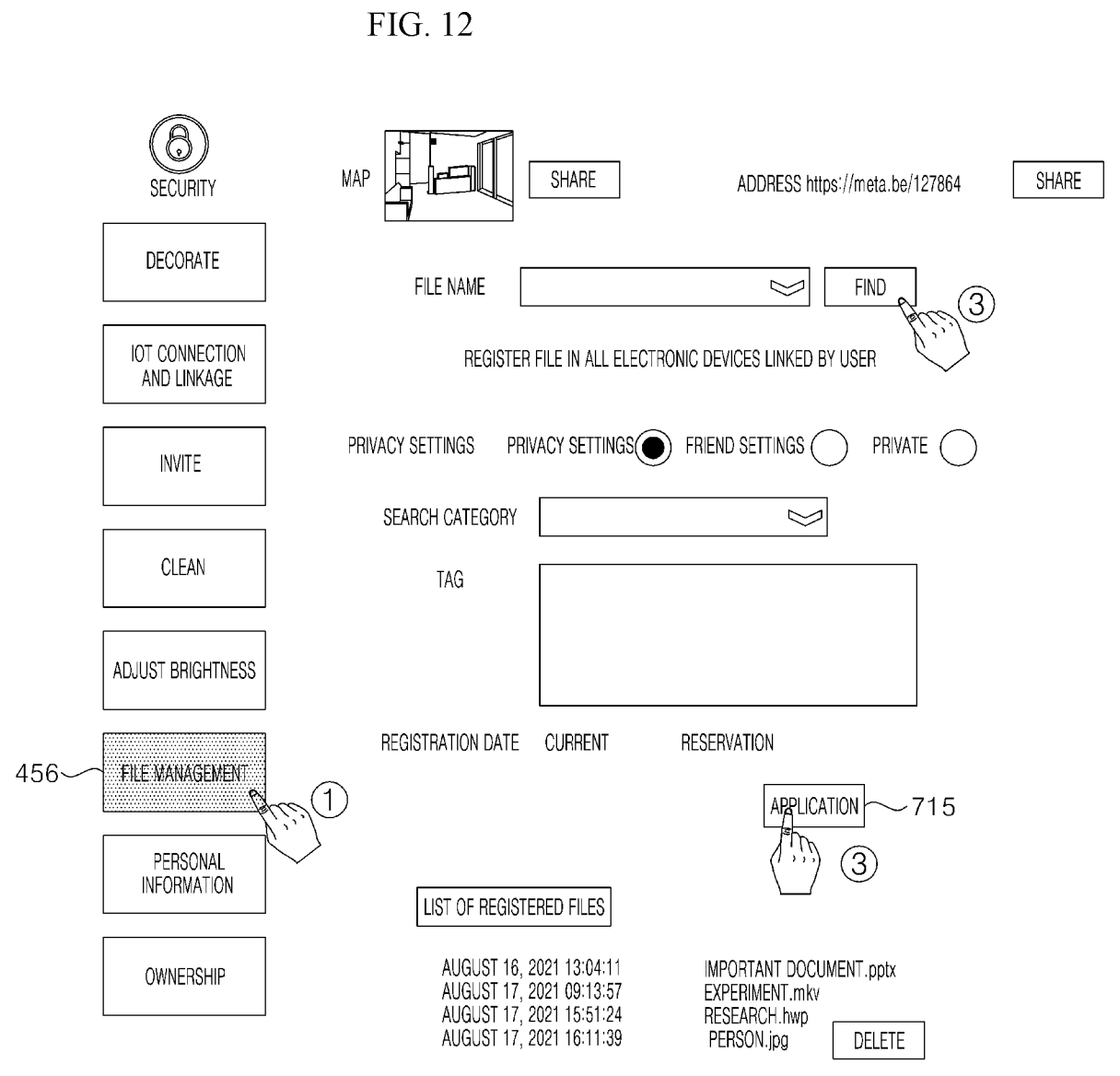

SECURITY
DECORATE
IOT CONNECTION AND LINKAGE
INVITE
CLEAN
ADJUST BRIGHTNESS
FILE MANAGEMENT
PERSONAL INFORMATION
OWNERSHIP
456
1

MAP
SHARE
ADDRESS https://meta.be/127864
SHARE

FILE NAME
FIND
3
REGISTER FILE IN ALL ELECTRONIC DEVICES LINKED BY USER

PRIVACY SETTINGS
PRIVACY SETTINGS
FRIEND SETTINGS
PRIVATE

SEARCH CATEGORY

TAG

REGISTRATION DATE
CURRENT
RESERVATION

APPLICATION
3
715

LIST OF REGISTERED FILES

AUGUST 16, 2021 13:04:11 IMPORTANT DOCUMENT.pptx
AUGUST 17, 2021 09:13:57 EXPERIMENT.mkv
AUGUST 17, 2021 15:51:24 RESEARCH.hwp
AUGUST 17, 2021 16:11:39 PERSON.jpg

DELETE

FIG. 24

DISPLAY AUGMENTED REALITY OF MEMBER STORE ACCORDING TO CURRENT OFFLINE LOCATION

METAVERSE SYSTEM FOR PROVIDING ECONOMIC MANAGEMENT SYSTEM TO CONVERGENCE SPACE IN WHICH REAL WORLD AND VIRTUAL WORLD ARE CONVERGED

TECHNICAL FIELD

The present invention relates to a metaverse system for providing an economic management system to a convergence space in which the real world and a virtual world are converged.

BACKGROUND ART

Recently, virtual reality, augmented reality, and mixed reality technologies that apply computer graphics technology have been developing. In this case, the virtual reality technology refers to a technology that uses computers to build a virtual space that does not exist in the real world and then make the virtual space feel like the real world, and the augmented reality or mixed reality technology is a technology of adding and expressing computer-generated information on the real world, that is, a technology of implementing interaction with a user in real time by combining the real world and a virtual world.

Among these, the augmented reality and mixed reality technologies are being used in combination with technologies in various fields (e.g., broadcasting technology, medical technology, game technology, etc.) and Korean Patent Laid-Open Publication 10-2014-0036555. A case where a weather map in front of a weather forecaster on TV changes naturally or a case where, in sports broadcasting, advertising images that do not exist in a stadium are inserted and transmitted to a screen as if they really existed in the stadium is a representative example of augmented reality technology being applied to the field of broadcasting technology. In particular, the augmented reality and mixed reality technologies are being implemented and provided as various application services with the advent of smart phones. A representative service for providing the augmented reality or mixed reality to users is metaverse. The metaverse is a compound word of "meta" meaning processing and abstraction, and "universe" meaning the real world, and refers to a three-dimensional virtual world. The metaverse is a more advanced concept than the existing term virtual reality environment, and provides an augmented reality environment in which the virtual world such as a web and the Internet is absorbed into the real world. In other words, the metaverse is a compound word of "meta" meaning processing and abstraction, and "universe" meaning the real world, and refers to a three-dimensional virtual world.

In addition, the metaverse is a more advanced concept than the virtual reality, and is a form in which the virtual worlds such as the web and the Internet have been absorbed into the real world. The metaverse may provide a living and game-type virtual world where both reality and unreality may coexist in general aspects of politics, economy, society, and culture, and provide users with a new dimension of the world by bringing reality and imagination together without constraints of space and time. A concept similar to the metaverse is digital twin. A digital twin is a technology that implements real objects and systems as virtual digital twins, acquires real-time data using sensors, and performs analysis and simulation on the real-time data to enable effective operation and prediction.

In other words, the digital twin implements and interacts with a physical environment identical to the real world, and the metaverse is characterized by allowing an avatar (character) that resembles oneself to explore various virtual worlds. As representative examples, city-building games, such as Simcity and Cities Skylines, are games in which users create their own city infrastructure based on production tools provided by an operation server, and are only simulations as they only provide game mechanics for setting up zones and placing facilities, virtual real estate games like Earth2 only divide land on an online map, sell the divided lands to users, and allow transactions between the users, and thus, have the limitation that users' stay time in the game is short, and Roblox and Jaebumto have a problem of reducing fun in that a user have no choice but to engage in limited activities on a limited virtual map. In other words, in reality, a game is played only in a virtual space without considering the real location, space, background, and environment (e.g., weather, etc.), so it is not possible to provide a metaverse game in the true sense of convergence of a virtual world and the real world.

DISCLOSURE

Technical Problem

The present invention provides a metaverse system for providing an economic management system to a convergence space in which the real world and a virtual world are converged.

Technical Solution

According to an embodiment of the present invention, a metaverse system for providing an economic management system to a convergence space in which the real world and a virtual world are converged includes: a user terminal configured to execute a metaverse game that supports an avatar configured by a user and a convergence economy service, by which an economic activity is performed in a convergence space in which a virtual world where the avatar is active and the real world are converged; and a metaverse game server configured to provide information accompanying movement and a transaction of the avatar within the metaverse game space as convergence information obtained through the convergence of the virtual world and the real world, and provide a metaverse game in which a result according to a transaction action of the avatar is reflected in a convergence economy.

Advantageous Effects

According to an embodiment of the present invention, by using a metaverse system for providing an economic management system to a convergence space in which the real world and a virtual world are converged, each game participant (operator, user, production company, developer, owner, business operator, member store, affiliated company, etc.) can perform their respective roles to conduct economic transactions, and thus pursue economic activities similar to those that occur in real society.

DESCRIPTION OF DRAWINGS

FIGS. 5 to 15 are detailed configuration diagrams of a manager page of the manager page unit illustrated in FIG. 4 and detailed configuration diagrams of each function of the manager page.

Figure 24:
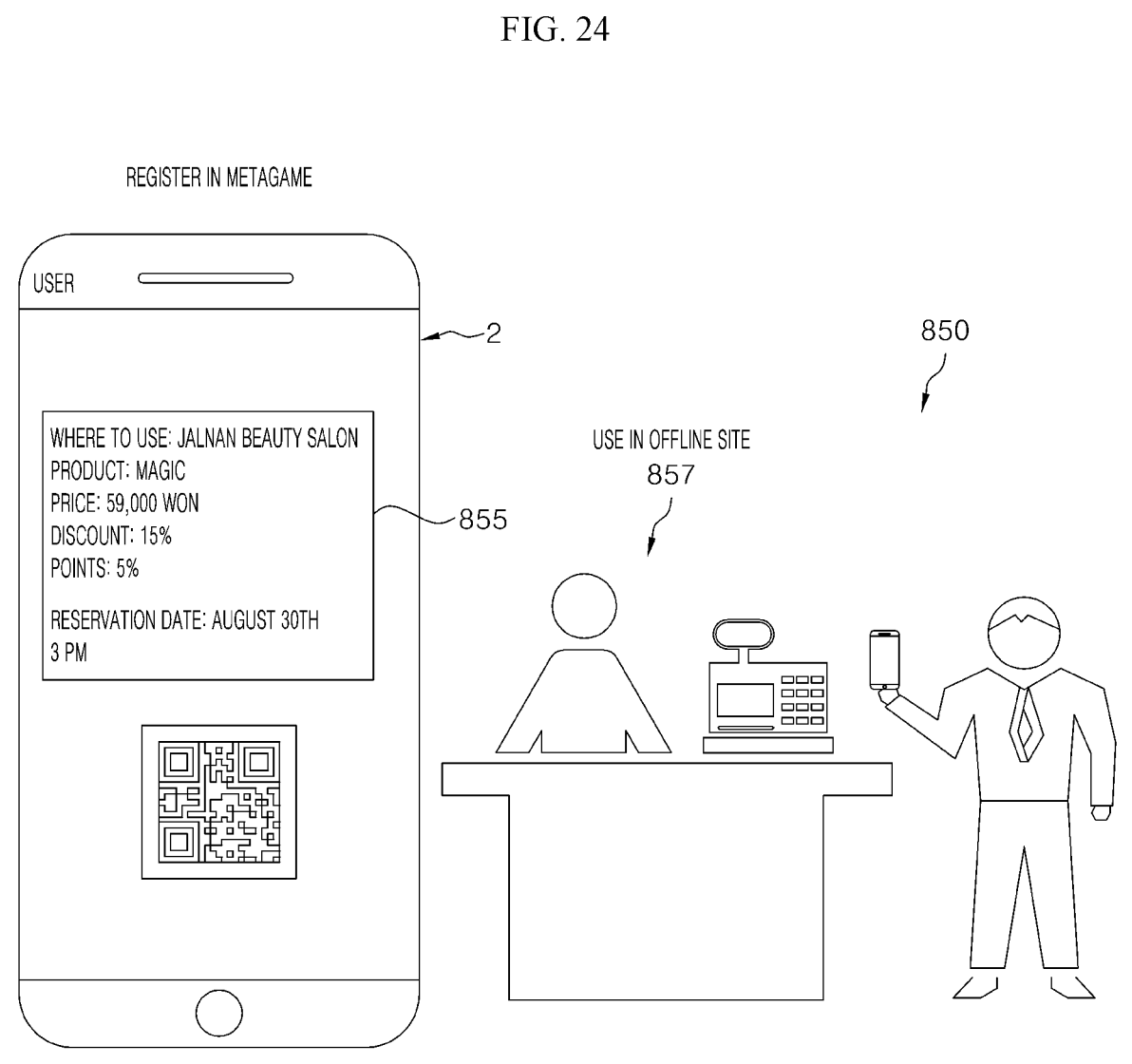

FIGS. 18 to 24 are exemplary diagrams for describing a use of a user use unit illustrated in FIG. 4.

BEST MODE

Figure 1:
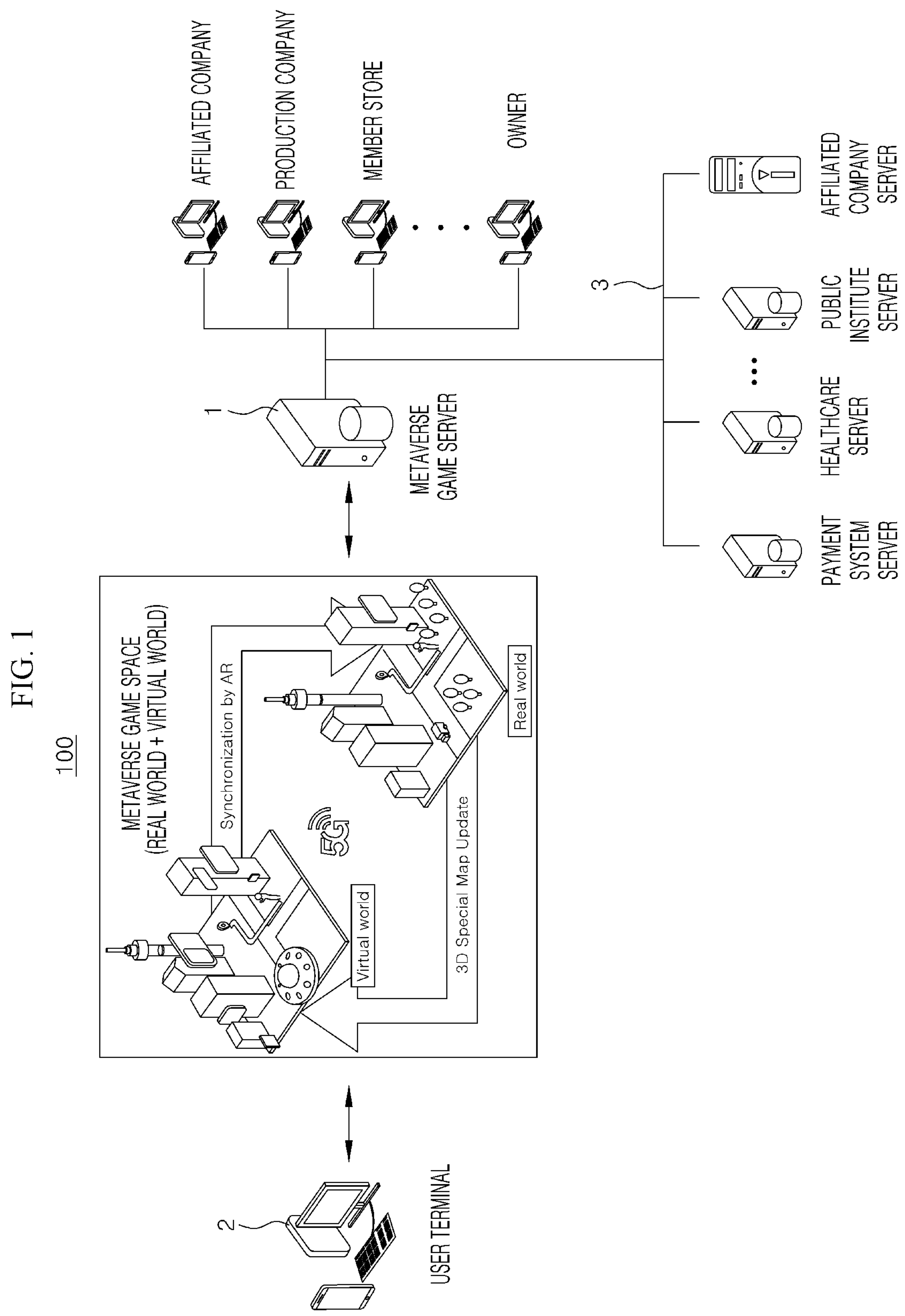
FIG. 1 is a network configuration diagram of a metaverse system for providing an economic management system to a convergence space in which the real world and a virtual world are converged according to an embodiment of the present invention.

Hereinafter, preferred embodiments of the present invention will be described in detail with reference to the accompanying drawings.

In this specification, the term "user" refers to any user who wishes to use a metaverse game service for providing an economic management system to a convergence space in which the real world and a virtual world are converged according to the present invention, or any entity registered as a member (a member store, a business operator, an affiliated company, a production company, or a public institution).

In this specification, the term "user terminal" refers to a terminal apparatus (device) owned by a user, a member store, a business operator, an affiliated company, a production company, or a public institution that wishes to use the metaverse game service for providing an economic management system to a convergence space in which the real world and a virtual world are converged according to the present invention, and may be a dedicated device that is linked with a metaverse game server 1 according to the present invention or a device in which an application or a program is installed.

In this specification, the term "owner" may refer to a user who has purchased a least one of a house, an office, a store, or a building and then has registered ownership of the purchased property, in which the user uses a metaverse game service for providing an economic management system to a convergence space in which the real world and a virtual world are converged according to the present invention.

In this specification, the term "pre-sale" refers to registering and announcing location information, appearance information, plan view information, and background information in the metaverse game service for providing an economic management system to a convergence space in which the real world and a virtual world are converged according to the present invention, and providing ownership to at least one of users who has applied for a pre-sale.

In this specification, the term "(virtual) convergence economy" refers to an economic system in which an economic system built in virtual space and an economic system built in real space are linked and mixed, and in another sense, may be interpreted as an economic term referring to industries implemented in a virtual world and the real world with different technologies or advantages converging to exert a synergy effect.

In the following description, the term indicating the "metaverse system for providing an economic management system to a convergence space in which the real world and a virtual world are converged" according to the present invention may be abbreviated as "metaverse game system," "metaverse system," or "system" for convenience of description.

Hereinafter, a metaverse system for providing an economic management system to a convergence space in which the real world and a virtual world are converged according to an embodiment of the present invention will be described in more detail with reference to the accompanying drawings.

Figure 2:
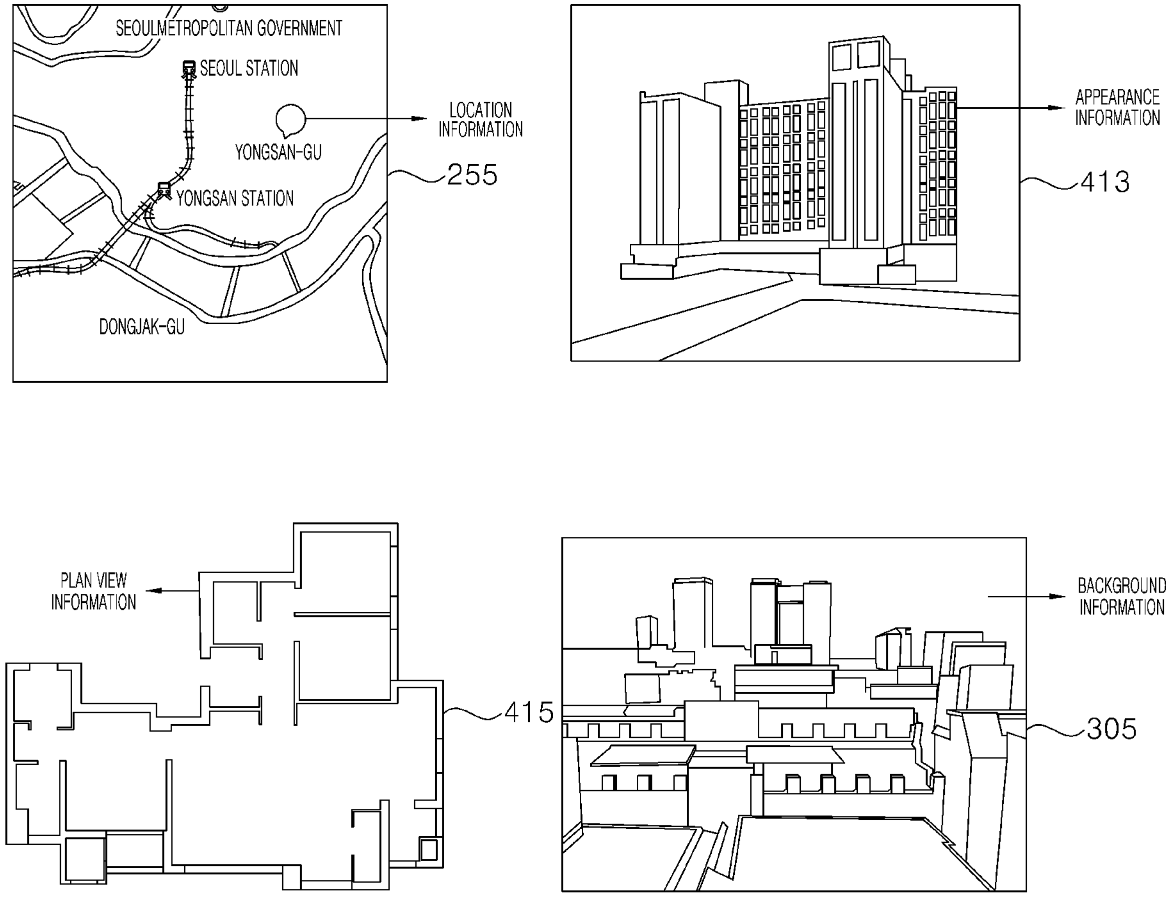
FIG. 2 is an exemplary diagram of pre-sale information.
Figure 3:
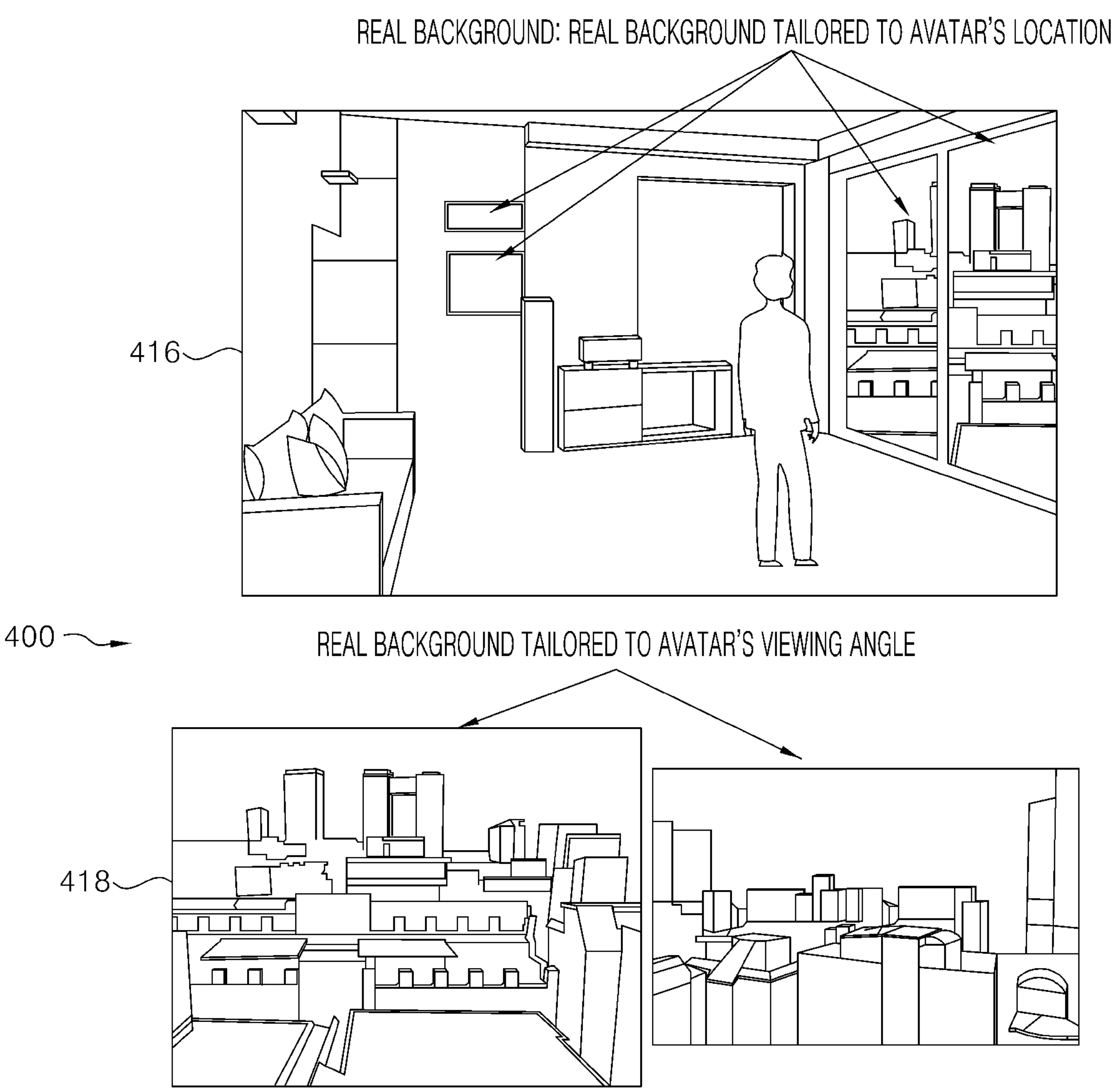
FIG. 3 is an exemplary diagram for describing a convergence space in which the real world and a virtual world are converged.
Figure 4:
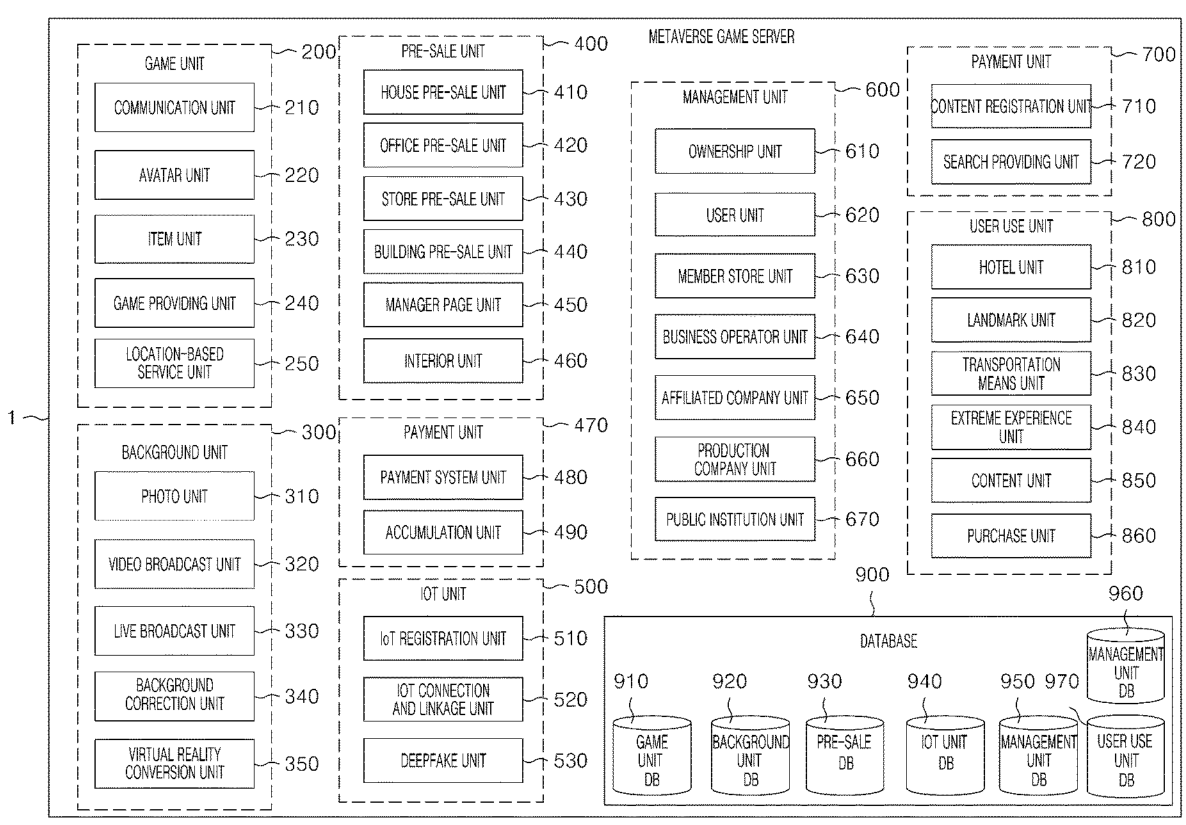
FIG. 4 is a detailed configuration diagram of a metaverse game server illustrated in FIG. 1.
Figure 5:
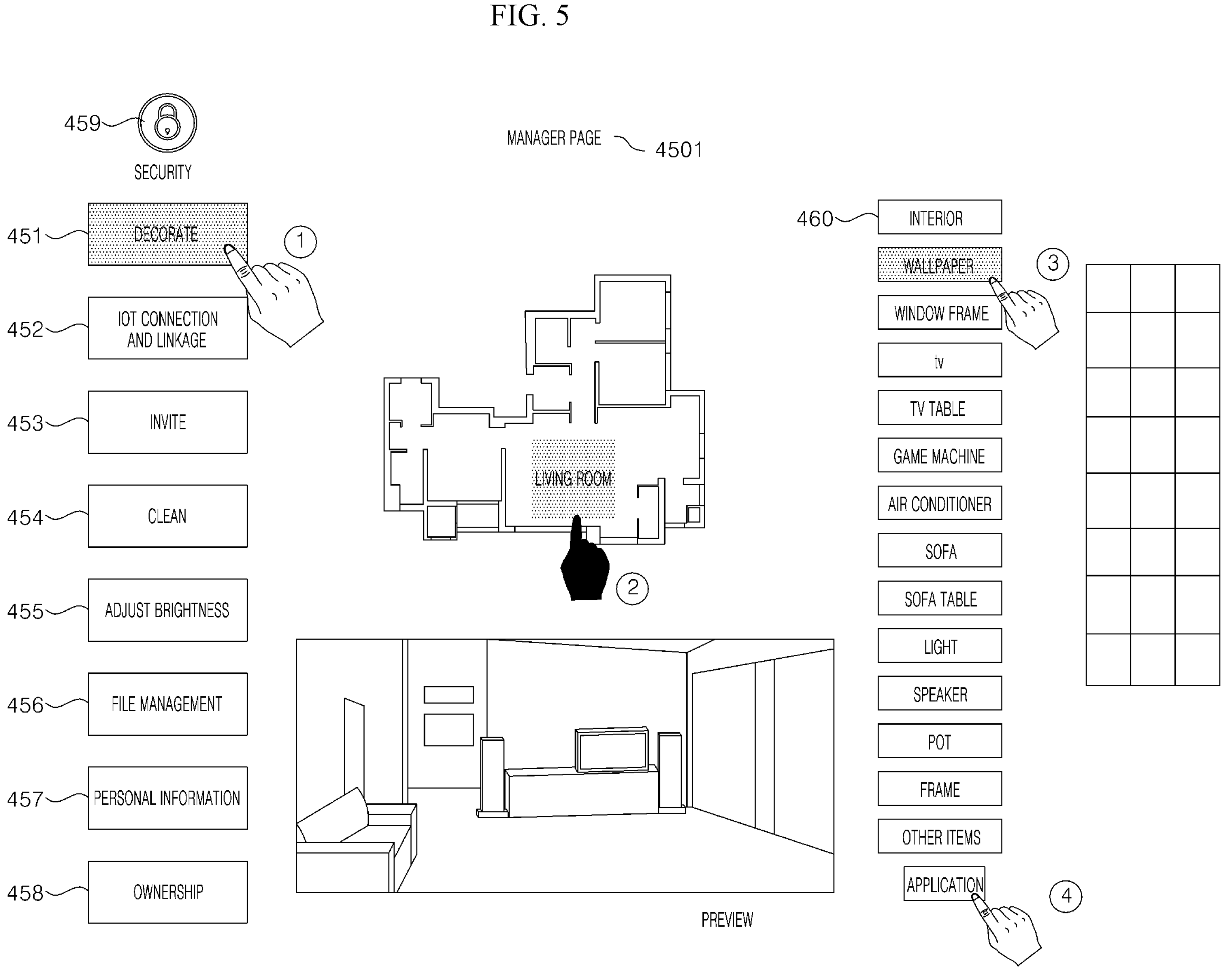
Figure 6:
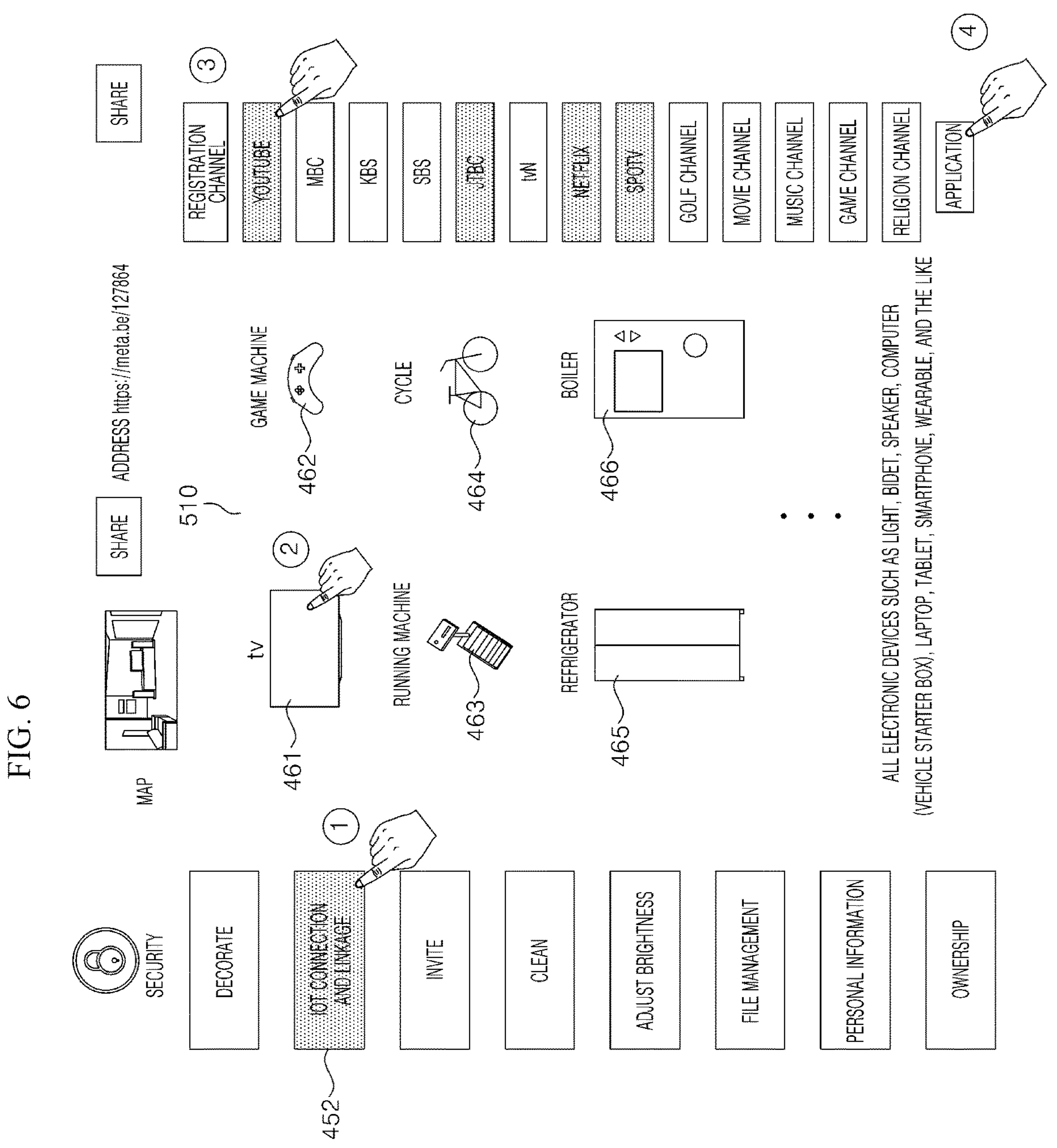
Figure 9:
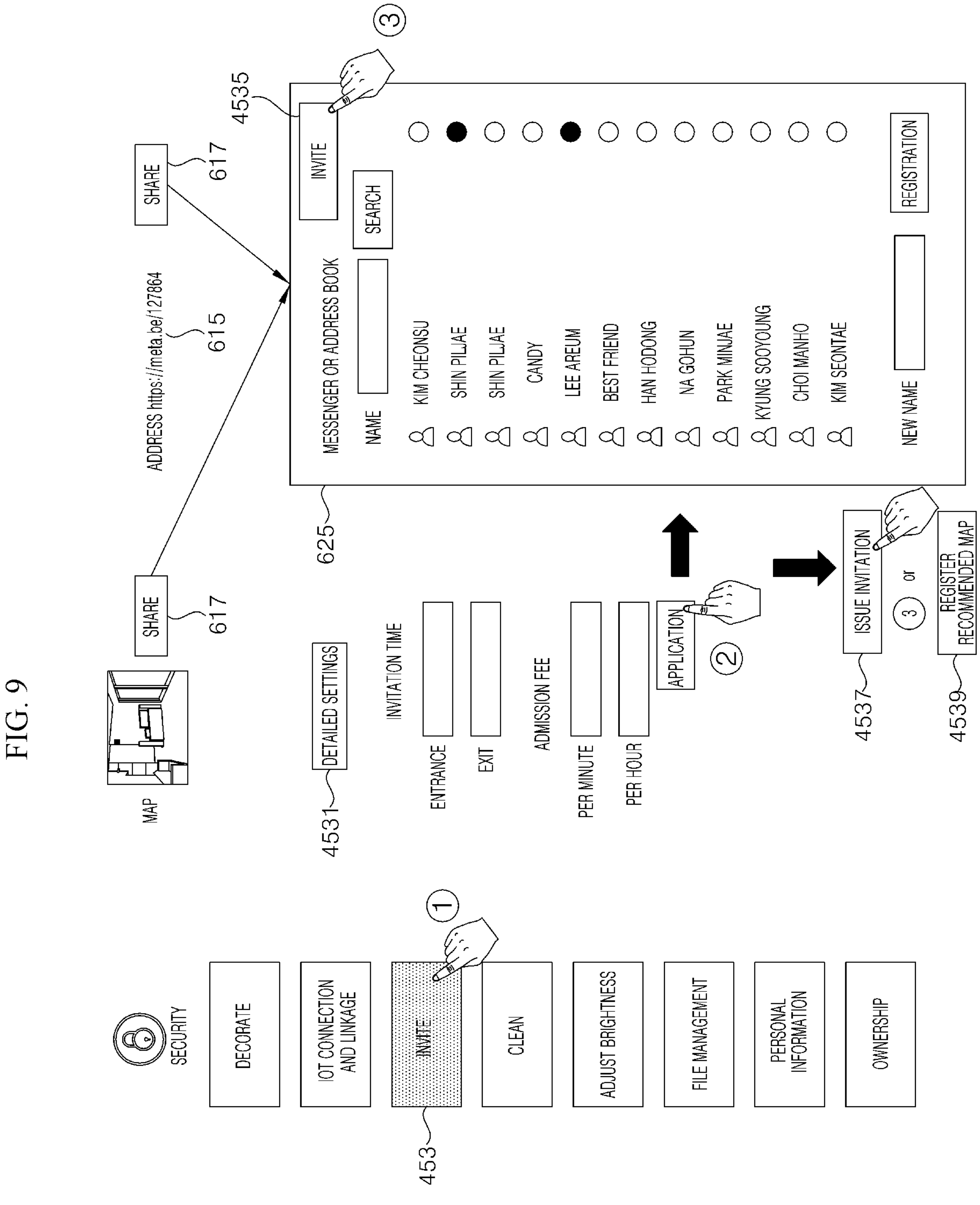
Figure 10:
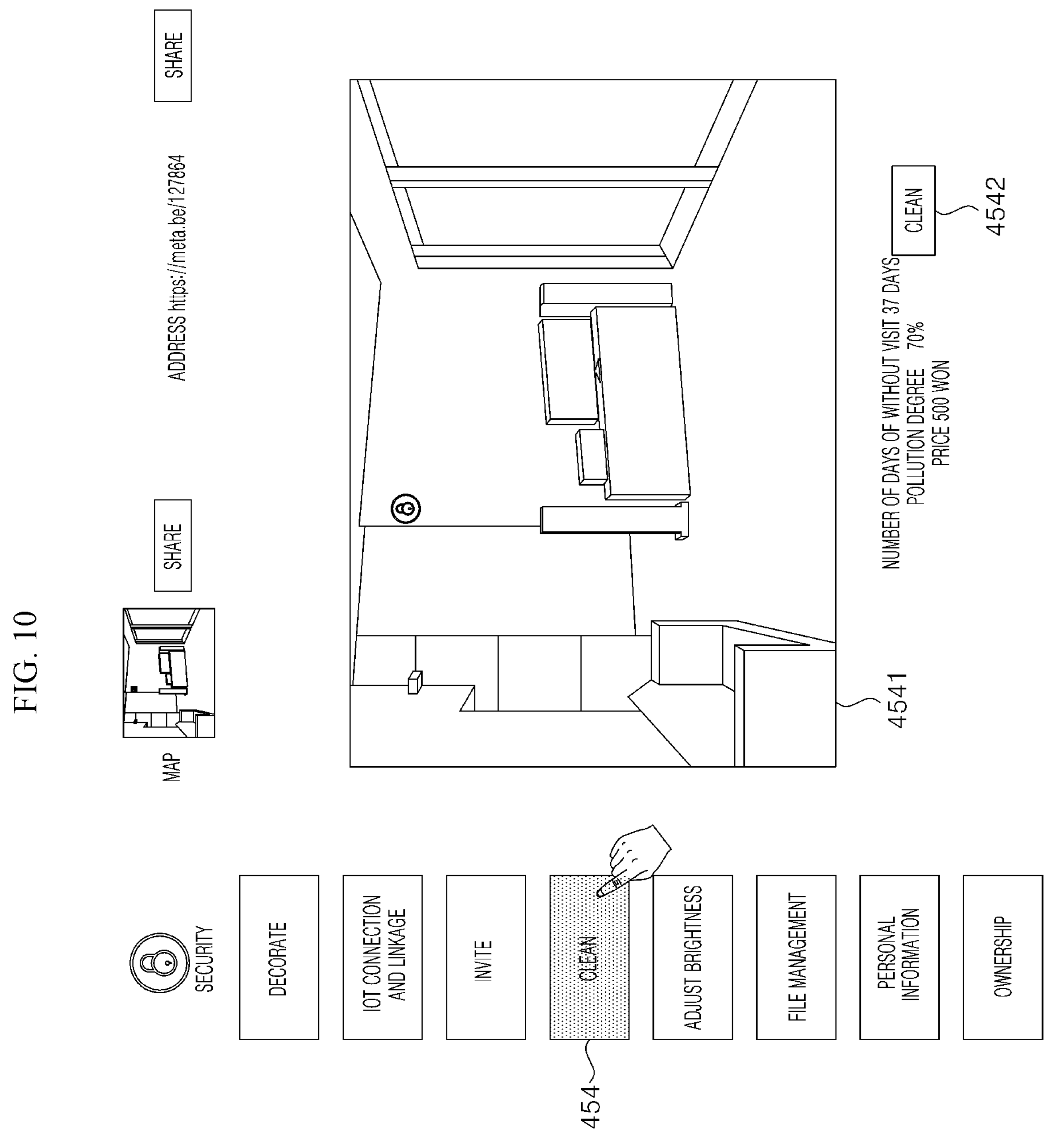
Figure 11:
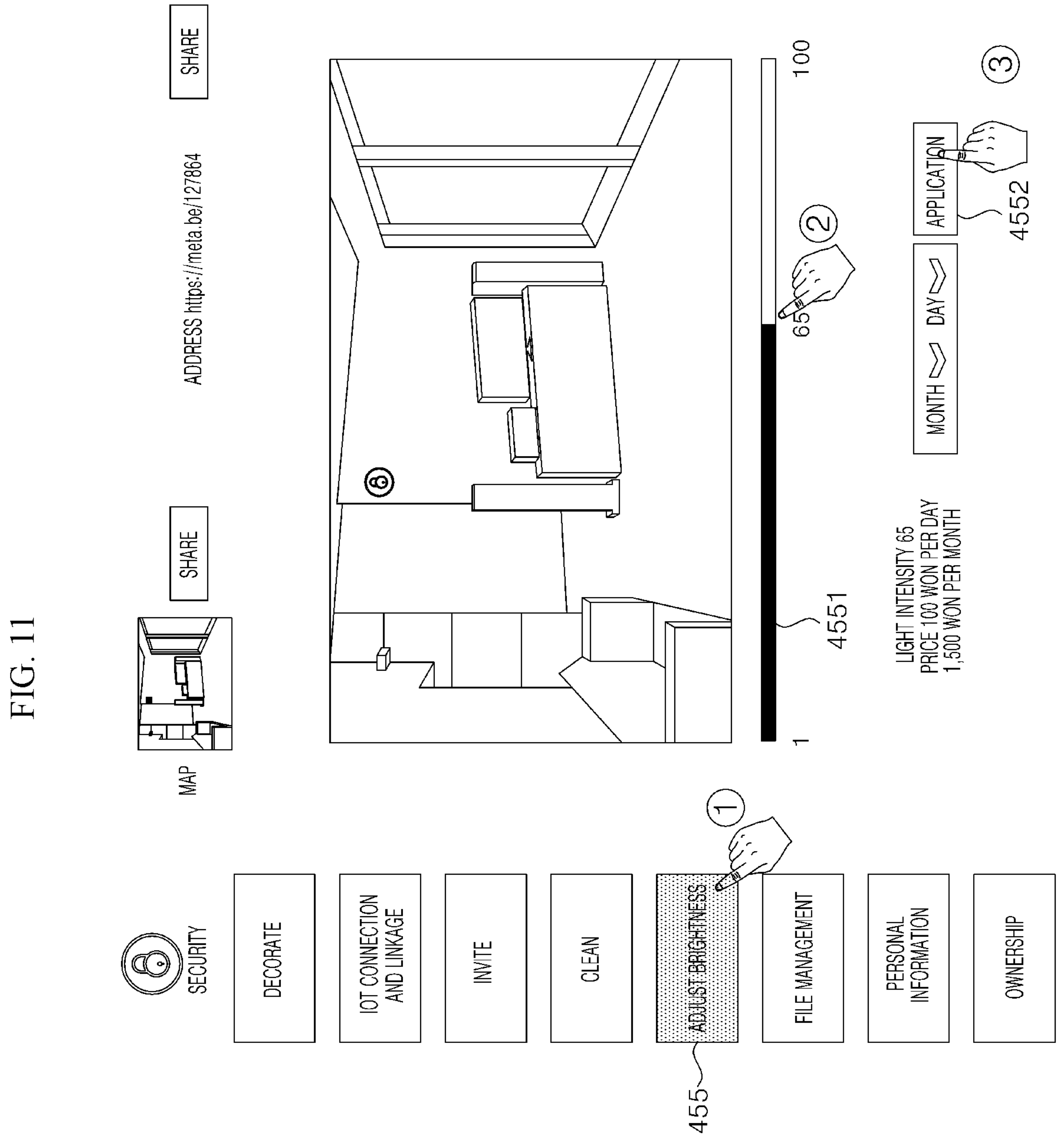
Figure 13:
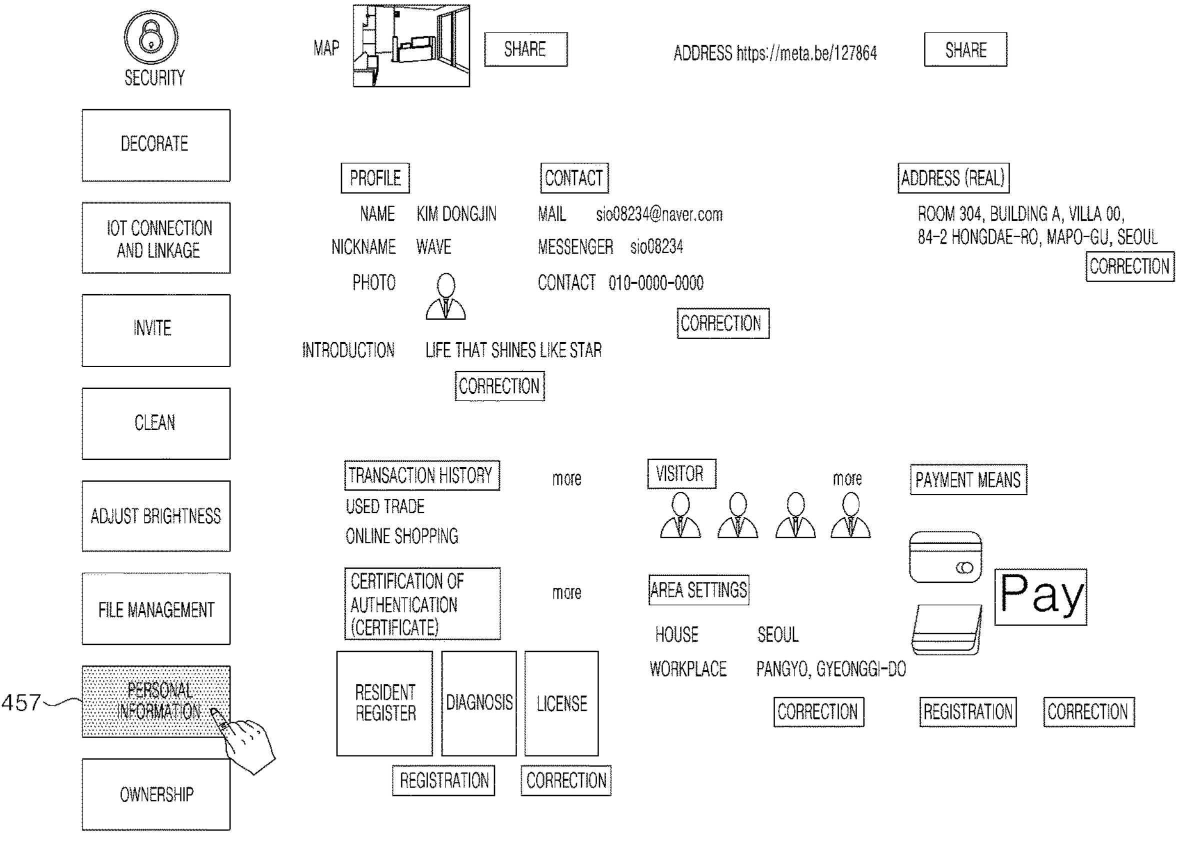
Figure 14:
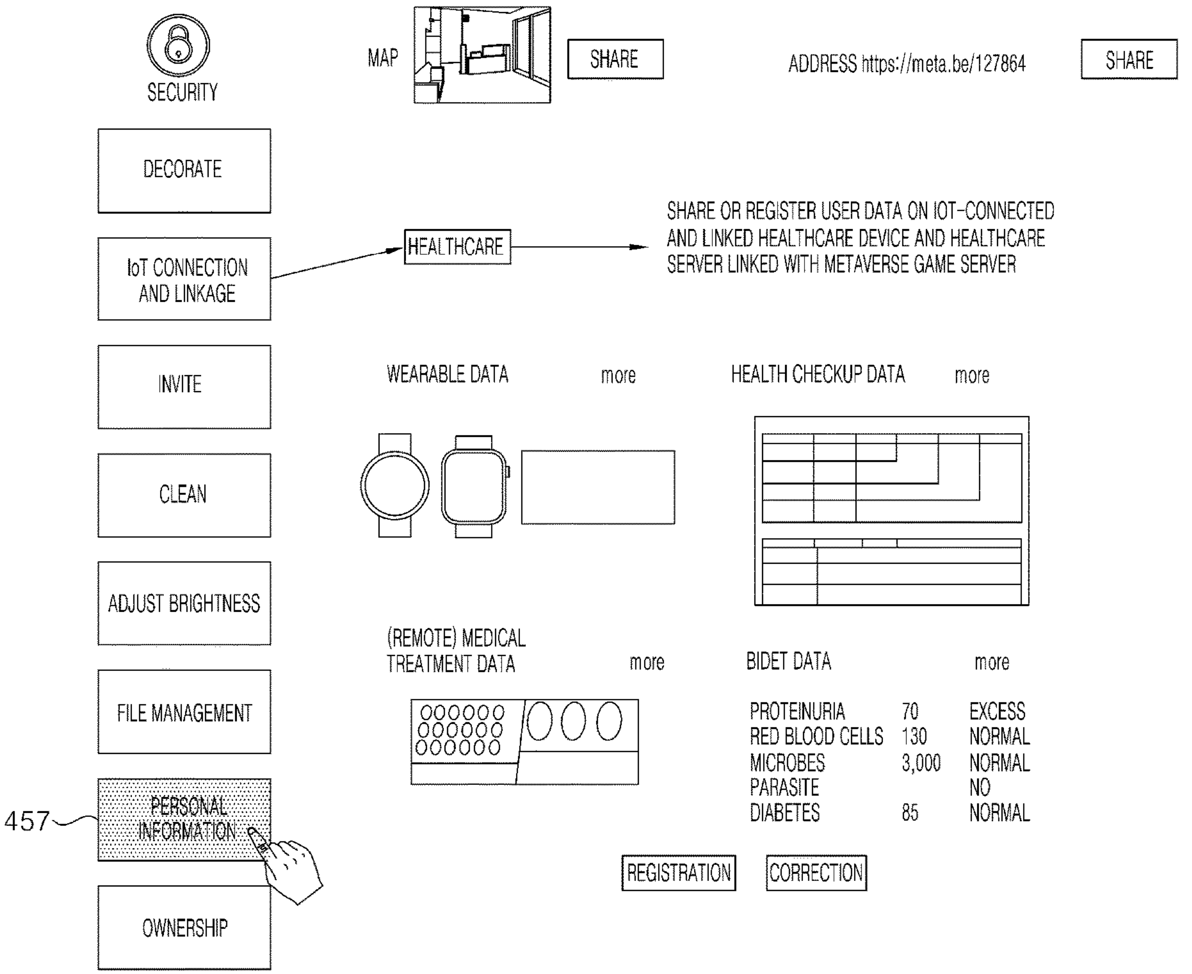
Figure 15:
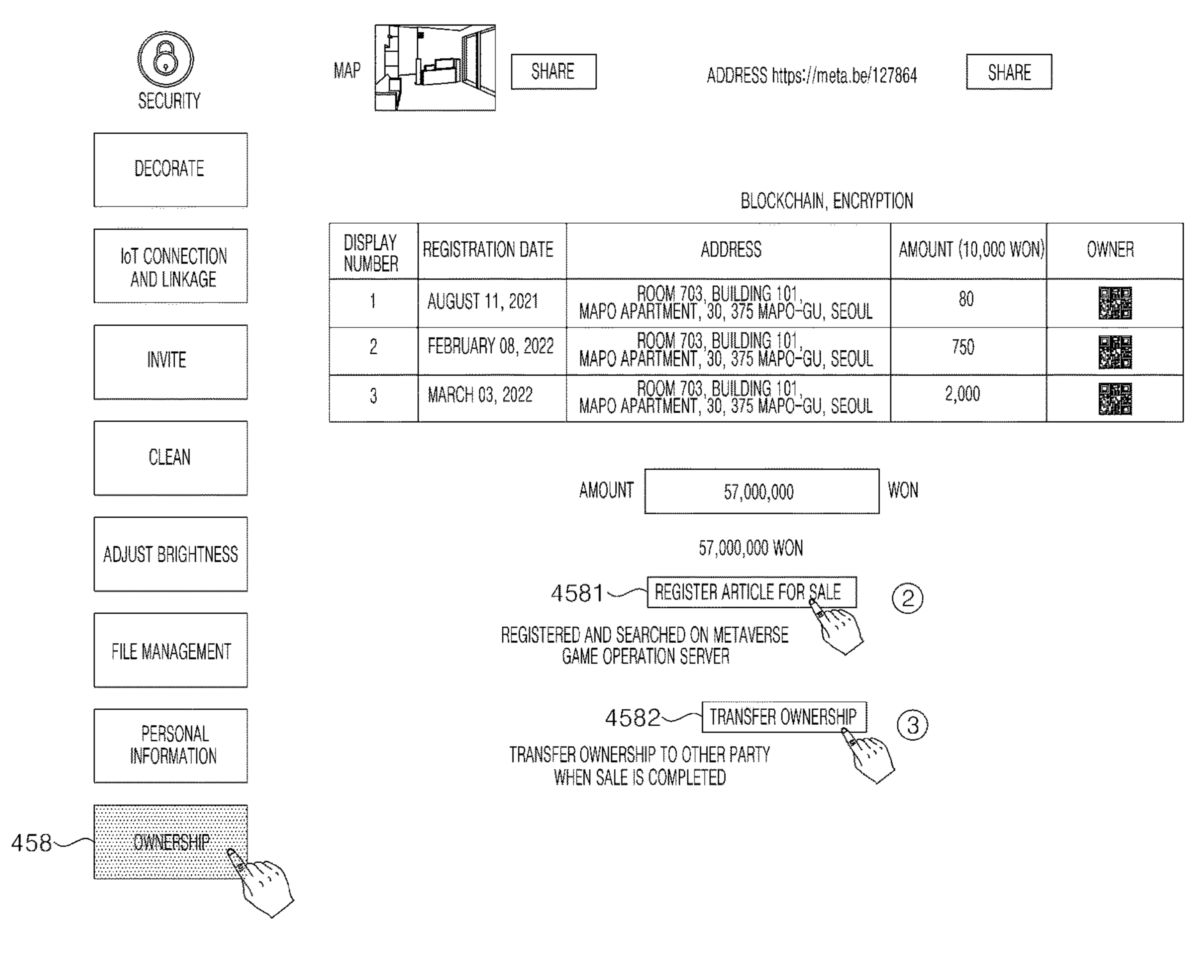
Figure 16:
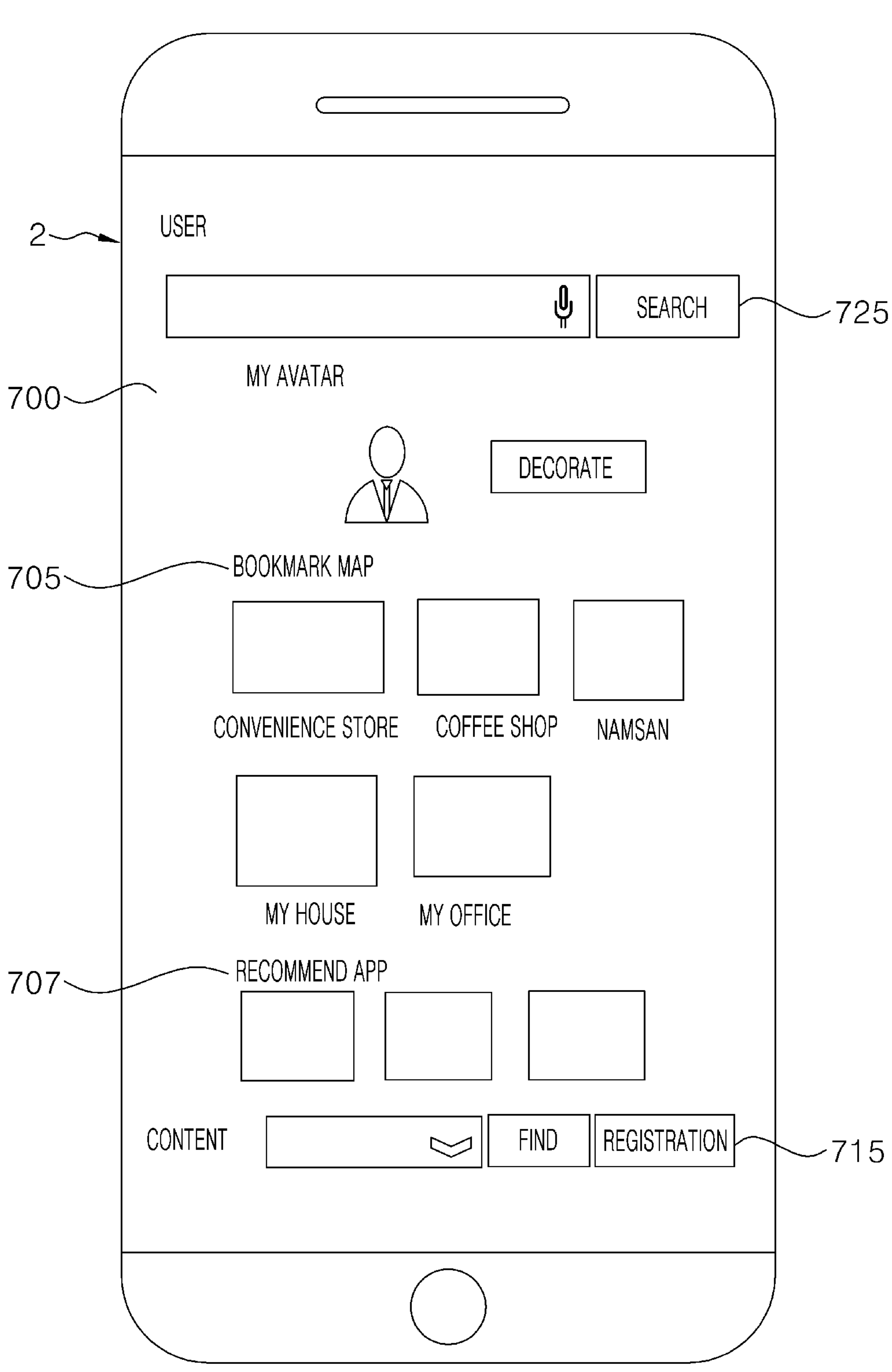
FIG. 16 is a diagram illustrating a main screen configuration of a user terminal.
Figure 17:
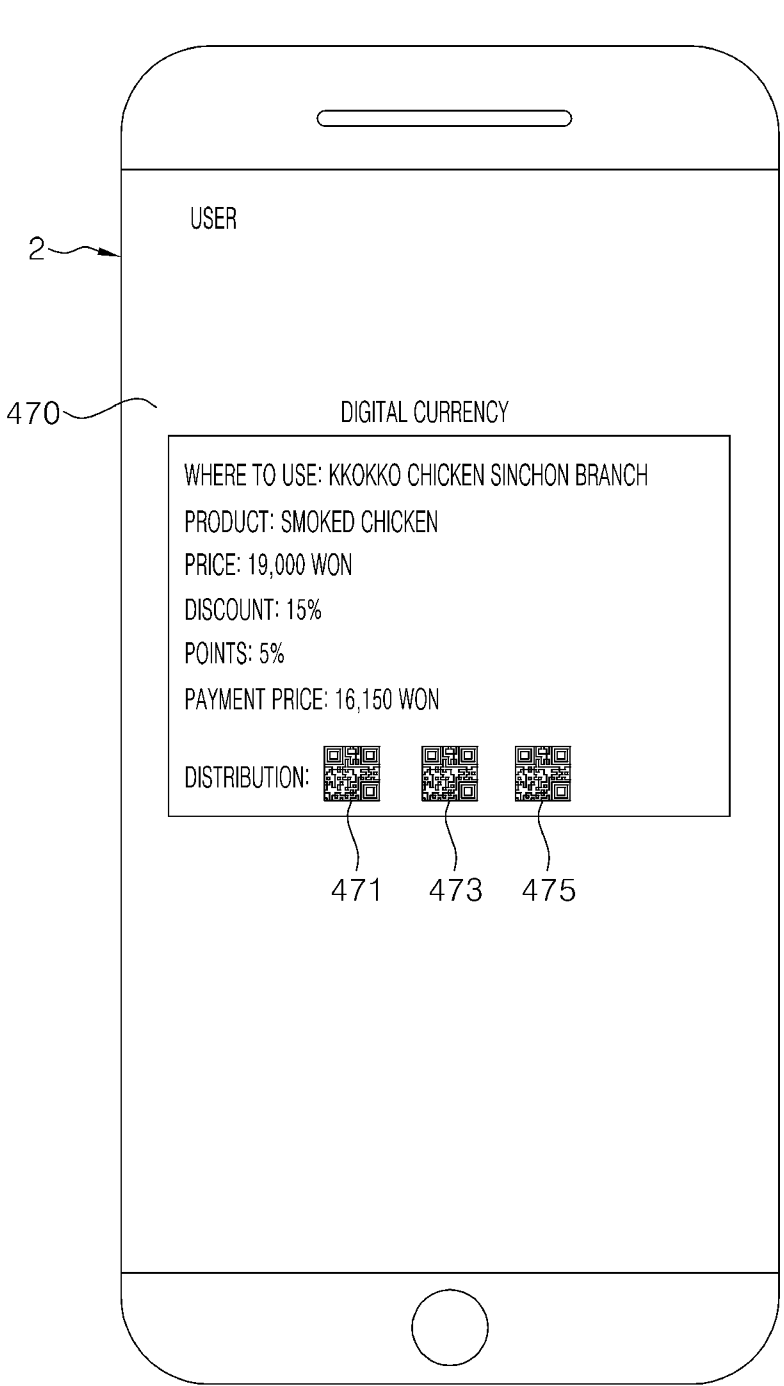
FIG. 17 is an exemplary diagram for a use of digital currency.
Figure 25:
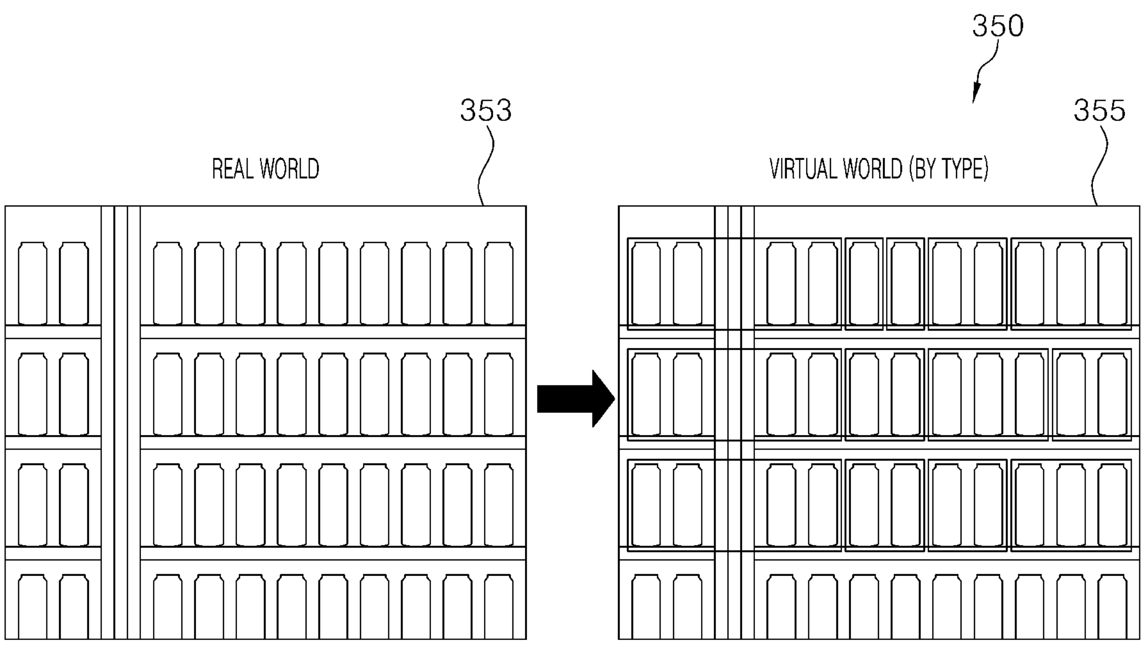
FIG. 25 is an exemplary diagram for describing an implementation example of a virtual reality conversion unit illustrated in FIG. 4.
Figure 26:
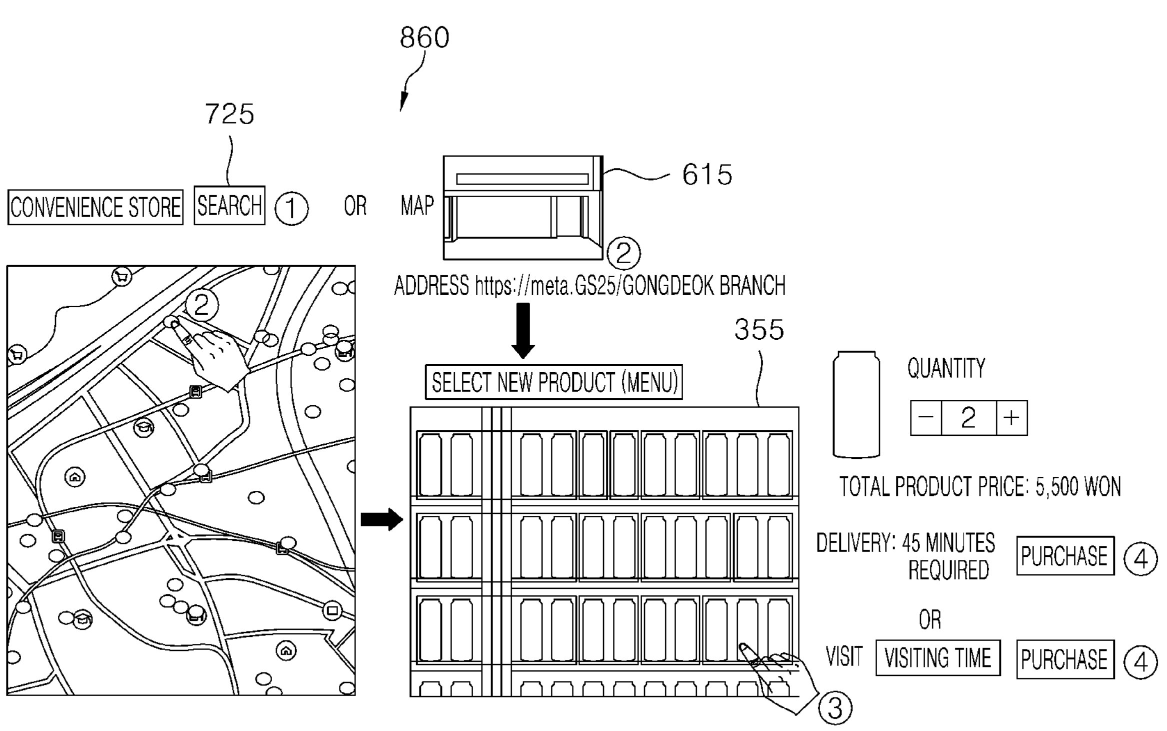
FIGS. 26 and 27 are exemplary diagrams for describing an implementation example of a purchase unit illustrated in FIG. 4.
Figure 27:
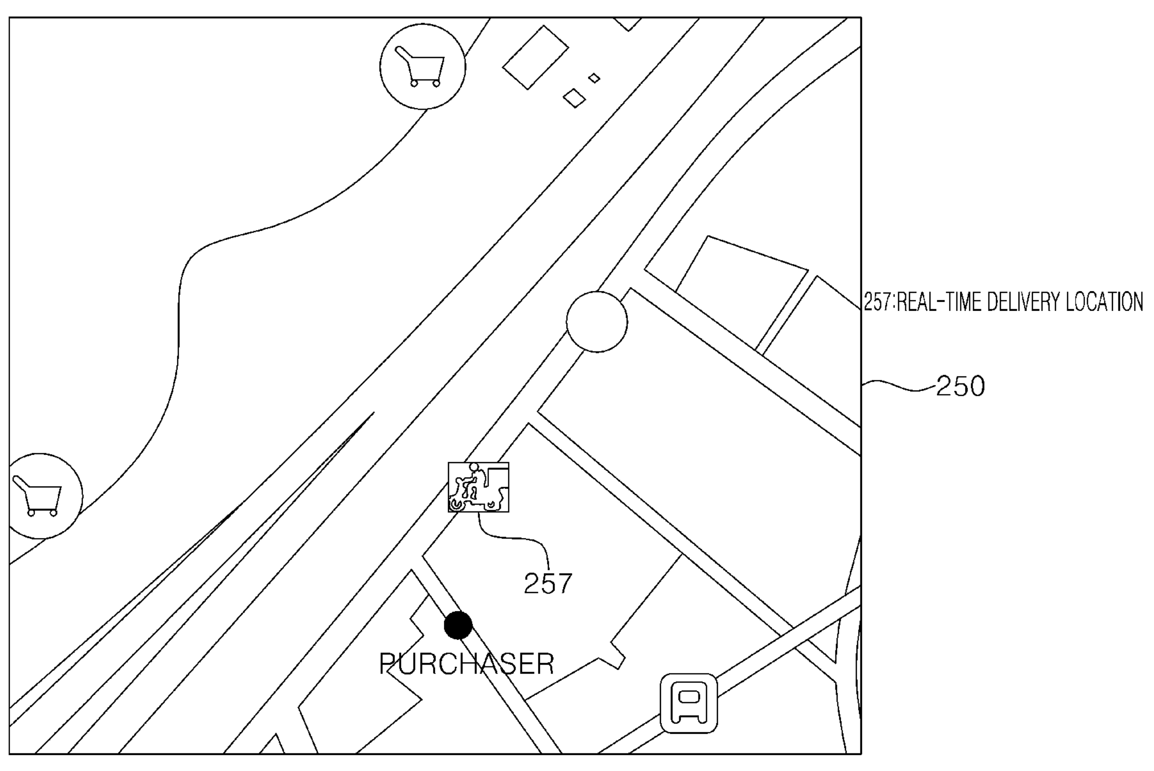
Figure 28:
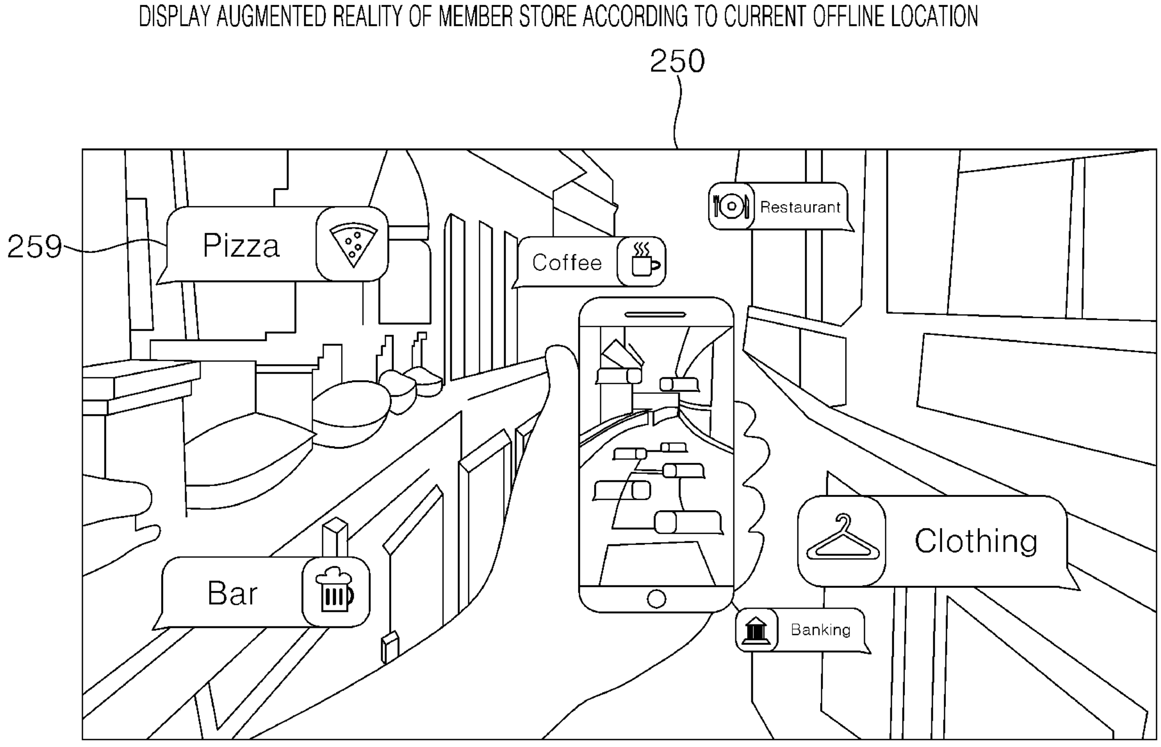
FIG. 28 is an exemplary diagram for describing an implementation example of a location-based service unit illustrated in FIG. 4.

FIG. 1 is a network configuration diagram of a metaverse system for providing an economic management system to a convergence space in which the real world and a virtual world are converged according to an embodiment of the present invention, FIG. 2 is an exemplary diagram of pre-sale information, FIG. 3 is an exemplary diagram for describing a convergence space in which the real world and a virtual world converge, FIG. 4 is a detailed configuration diagram of a metaverse game server illustrated in FIG. 1, FIGS. 5 to 15 are detailed configuration diagrams of a manager page of the manager page unit illustrated in FIG. 4 and detailed configuration diagrams of each function of the manager page, FIG. 16 is a diagram illustrating a main screen configuration of a user terminal, FIG. 17 is an exemplary diagram for a use of digital currency, FIGS. 18 to 24 are exemplary diagrams for describing a use of a user use unit illustrated in FIG. 4, FIG. 25 is an exemplary diagram for describing an implementation example of a virtual reality conversion unit illustrated in FIG. 4, FIGS. 26 and 27 are exemplary diagrams for describing an implementation example of a purchase unit illustrated in FIG. 4, and FIG. 28 is an exemplary diagram for describing an implementation example of a location-based service unit illustrated in FIG. 4.

First, as illustrated in FIG. 1, a metaverse system 100 for providing an economic management system to a convergence space in which the real world and a virtual world are converged according to an embodiment of the present invention may include a metaverse game server 1, a healthcare terminal, a business operator terminal, a production company terminal, a public institution terminal, an affiliated company terminal, a member store terminal, a user terminal, and a user terminal 2 that are linked to the metaverse game server 1, and a payment system server, a healthcare server, a business operator server, a production company server, a public institution server, an affiliated company server, and a member store server 3, in which the metaverse game server 1 communicates with each component over a network.

Meanwhile, each terminal described herein may be a dedicated device for each purpose, a device that downloads and executes an application for each purpose, or a device that has been granted some kind of authority provided by the metaverse game server 1.

In addition, each terminal may be configured to provide various types of information to reflect an economic management system of a convergence economy within a convergence space in which the real world and a virtual world converge provided by the metaverse game server 1.

The user, affiliated company, production company, developer, owner, business operator, public institution, and member store terminals are terminals that execute a metaverse game disclosed herein, and a Personal Communication System (PCS), a Global System for Mobile Communications (GSM), a Personal Digital Cellular (PDC), a Personal Handyphone System (PHS), a Personal Digital Assistant (PDA), International Mobile Telecommunication (IMT)-2000, Code Division Multiple Access (CDMA)-2000, W-Code Division Multiple Access (W-CDMA), and Wireless Broadband Internet (Wibro) terminals, all types of game devices and communication devices such as a dedicated game machine, a console game machine, a television (TV), a personal computer (PC), a laptop, a car PC, a vehicle display, smart glasses, a smart lens, a virtual reality (VR) device, HoloLens, a smartphone, a smartpad, and a tablet PC, a handheld-based mobile terminal device, and known computing devices such as a stationary PC and a laptop may be used.

More specifically, the user terminal 2 may be configured to execute a metaverse game that supports a convergence economy service so that a convergence economy is performed within an avatar configured by a user and a convergence space in which a virtual world where the avatar is active and the real world converge.

Here, the metaverse game described herein may be a game space created based on a three dimensional-Geographic Information System (3D-GIS) on a web or an app as a convergence space where a real space converges within a virtual space.

Here, the convergence space may be called artificial reality, cyberspace, a virtual world, a virtual environment, a synthetic environment, an artificial environment, etc.

Virtual reality systems developed so far include window systems, mirror systems, vehicle-based systems, cave systems, immersive virtual reality systems, and augmented reality systems, etc.

The metaverse may be broadly classified into four categories (① augmented reality, ② Lifelogging, ③ mirror world, and ④ virtual world), and as a similar concept, there is digital twin.

First, the augmented reality is a technology of overlapping virtual objects on the real world seen through a user's eyes. The augmented reality is also called mixed reality because it brings the real world together with a virtual world having additional information in real time and displays the converging real world and virtual world as a single video. It is a hybrid VR system that brings real and virtual environments together.

The augmented reality, which is a concept that complements the real world with the virtual world, uses a virtual environment created by computer graphics, but a main focus of augmented reality is the real environment. The computer graphics play the role of providing additional information necessary for the real environment. This means that a distinction between a real environment and a virtual screen becomes blurred by overlapping a 3D virtual video on a real video that a user is seeing.

A wearable computer enables augmented reality outdoors. In particular, a head-mounted computer screen device enables the augmented reality by overlapping computer graphics, text, and the like on the real environment seen by the user and displaying the overlapped computer graphics, text, and the like. Therefore, research on the augmented reality mainly focuses on the development of the wearable computer. The developed augmented reality system includes a head mounted display (HMD), such as a video method and an optical method. Recently, smart glasses (Google glasses) have also been released by Google.

Next, lifelogging is a technology of recording experience information that occurs to oneself in reality and reproducing the recorded experience information later. Representative examples include taking pictures of daily information and uploading the pictures to web social communities such as SNS, blogs, and Facebook, and the act of taking pictures with a digital camera itself may be considered lifelogging. Nike and Apple's Nike Plus is another example. Information generated while running in Nike sneakers is transmitted to a web by an iPod and forms a community, through which each user's exercise pattern may be identified. In other words, the lifelogging is a backup and community technology that digitizes and stores information on an individual's daily experiences in the real world.

Next, a mirror world is an informational expansion virtual world based on the real world, and is a space in which environmental information from the real world is constructed in a virtual space, which is a service for projecting the real world to the virtual world like a mirror.

In other words, it is a technology of converting surface video data of the entire Earth into data and providing services to the entire world, and due to the continuous accumulation of information and technological advancement, provides three-dimensional simulation terrain information identical to reality, rather than two-dimensional information illustrated in the sky.

Next, the virtual world applies an environment similar to the real world to a digital space, which is a service for allowing a user to directly reflect his/her will through an avatar and enabling political, cultural, economic, and social activities in the virtual world at a similar level to the real world.

Next, digital twin refers to a technology of implementing things or environments in the real world exactly like a twin in the virtual world.

Referring to FIG. 1, by connecting and linking the metaverse game server 1 with external servers such as a payment system server, a healthcare server, a business operator server, a production company server, a public institution server, an affiliated company server, and a member store server 3 which are external servers, content may be registered in or provided to the metaverse system 100 providing an economic management system to a convergence space in which the real world and a virtual world are converged according to the embodiment of the present invention, and by making activities in the metaverse system using the avatar of the user terminal 2 interact between the metaverse game server 1 and a content provider, the convergence economy may be performed within the convergence space in which the real world and the virtual world converge.

The metaverse game server 1 provides information accompanying movement and a transaction of the avatar within the metaverse game space as convergence information obtained through the convergence of the virtual world and the real world, and provides a metaverse game in which a result according to a transaction action of the avatar is reflected in a convergence economy.

In addition, the metaverse game server 1 may include a component that collects a location and time of an avatar located in a virtual space, and viewpoint information at a real place, a real background, and a real location corresponding to a location and viewpoint of the avatar from a drone, a camera, a plurality of IoT devices, an external terminal, or an external server.

In addition, the metaverse game server 1 supports a management function of allowing a transaction action between avatars for a pre-sale, ownership acquisition, a sale, and a purchase of a house, a store, an office, and a building in which the real world and the virtual world converge in the metaverse game space to be treated as a real transaction action between users in the real world, and managing information related to the pre-sale, the ownership acquisition, the sale, and the purchase, and the management function may include a security function, a decoration function of decorating an internal space, an IoT connection and linkage function between a virtual IoT device and a real IoT device, a function of inviting acquaintances in a messenger and an address book, a function of cleaning a dirty internal space, a function of adjusting brightness of an internal space, a file management function of registering and managing files in all the linked IoT devices, a personal information function of registering and managing personal information, and an ownership function of registering an ownership certificate of authentication and an article for sale.

In addition, the metaverse game server 1 may apply the location of the avatar over time and an image, a real video, and/or a real-time video taken at a real place, a real background, and a real location corresponding to the location and viewpoint of the avatar to a pre-sale, a game, and a product supported in background information of the avatar and a metaverse game space.

In addition, the metaverse game server 1 may reflect sound information and real-time weather information in real photos or videos registered in the metaverse game space.

In addition, the metaverse game server may support a service for registering and correcting basic information on a profile, a contact, and an address (real), registering and correcting various certificates and certificates of authentication by being linked with a public institution server, an affiliated company server, a business operator server, and IoT devices, registering and correcting payment means by being connected to a payment system server, and registering and deleting one's health data by being linked with a healthcare server and a healthcare device among the IoT devices.

In addition, the metaverse game server may store block-chained, encrypted, or non fungible token (NFT)-ized ownership files or tokens, and support a service for transferring ownership to the other party when a sale is completed by registering an article for sale after entering an amount.

In addition, the metaverse game server may be linked with a payment system that supports, as transaction means performed in the metaverse game space, any one of in-app payment, digital currency, cryptocurrency, bank transfer through a bank, a credit card, a value added network (VAN), a payment gateway (PG), simple payment, and a gift certificate, and a detailed description of the payment system will be provided below.

In addition, the metaverse game server 1 may support a service for connecting and linking virtual IoT devices in the metaverse game with real IoT devices.

In addition, the metaverse game server 1 may register a character to be replaced with a character appearing in a streaming video, which are provided by the metaverse game, and apply the character to the character appearing in the streaming video according to a user's request.

In addition, the metaverse game server 1 may support experience services for experiencing accommodations, landmarks, transportation means, and extreme sports within the metaverse game space.

In addition, in the case of the transportation means (airplane, helicopter, ship, spacecraft, submarine, high-speed rail, taxi, bus, passenger car, cable car, tram, kickboard, cable car, zipline), the metaverse game server 1 may provide background information (real photo or video) outside a window while a user's avatar moves.

In addition, the metaverse game server 1 may be further connected to a healthcare server, a member store server, a business operator server, a public institution server, and an affiliated company server (hereinafter referred to as a content server), and may be linked with the content server to provide content through the metaverse game and provide registration means, payment means, authentication means, and recognition means.

In addition, the metaverse game server 1 may support registering sales information, disclosing the sales information, providing the sales information to users who have applied for subscription, providing payment means by being linked with the payment system unit, registering corresponding details upon payment, and transmitting the registered details to sellers.

In addition, the metaverse game server 1 may support electronic transaction services for purchasing, paying for, and delivering real products at stores within the metaverse game, check a real-time delivery location in the metaverse game upon delivery and purchase, and identify a current location of the user terminal to provide local member store information.

In addition, the metaverse game server 1 may provide payment means and payment recognition means through the payment system, or may provide a program to deduct user's accumulated data or points through an accumulation unit when using payment in content in a user's metaverse game and an offline member store, a business operator, an affiliated company, and a public institution where a member is registered.

More specifically, referring to FIG. 4, the metaverse game server 1 includes a game unit 200, a background unit, a pre-sale unit 400, a payment unit 470, an IoT unit 500, a management unit 600, a user unit 700, and a user use unit 800.

The game unit 200 may include: a communication unit 210 that classifies objects connected through an information and communication network, determines whether members of the objects exist, and performs data communication; an avatar unit 220 that creates and decorates a user's avatar according to the request from the user terminal; an item unit 230 that provides an item applicable to the created avatar and applies the item to the avatar according to the selection of the user terminal; a game providing unit 240 that may provide a metaverse game space in which the real world and a virtual world converge, use all content of the metaverse game space as the avatar, and reflect and provide background changes in the convergence space according to the movement of the avatar; and a location-based service unit 250 that provides various services to a user using location information obtained through a communication network, the Global Positioning System (GPS), or the like, a photo unit 310 that registers a real photo and applies the registered real photo to a pre-sale, a game, and a product as background information or provides the registered real photo to a search and sharing service of a user terminal; a video broadcast unit 320 that registers a real video and applies the registered real video to the pre-sale, the game, and the product as the background information or provides the registered real video to the search and sharing service of the user terminal; a live broadcast unit 330 that applies a real-time video transmitted from a registered camera to the pre-sale, the game, and the product as the background information or provides the real-time video to the search and sharing service of the user terminal; a background correction unit 340 that corrects an in-game background provided to the user by reflecting sound information and real-time weather information in the registered real photo or video; and a virtual reality conversion unit 350 that converts the registered real photo or video into virtual graphics that may be classified and selected by type in the metaverse game and provides the virtual graphics, the pre-sale unit 400 may include: a house pre-sale unit 410 that registers location information 255, appearance information 413, plan view information 415, and background information 305 of a house (hereinafter referred to as pre-sale information), notifies the user of the pre-sale information of the house, and provides ownership of the house to at least one of users who have applied for a pre-sale; an office pre-sale unit 420 that registers location information 255, appearance information 413, plan view information 415, and background information 305 of an office (hereinafter referred to as pre-sale information), notifies the user of the pre-sale information of the office, and provides ownership of the office to at least one of users who have applied for a pre-sale; a store pre-sale unit 430 that registers location information 255, appearance information 413, plan view information 415, and background information 305 of a store (hereinafter referred to as pre-sale information), notifies the user of the pre-sale information of the store, and provides ownership of the store to at least one of users who have applied for a pre-sale; a building pre-sale unit 440 that registers location information 255, appearance information 413, plan view information 415, and background information 305 of a building (hereinafter referred to as pre-sale information), notifies the user of the pre-sale information of the building, and provides ownership of the building to at least one of users who have applied for a pre-sale; a manager page unit 450 that provides a manager page that may be managed as an owner to a user who has purchased a house, an office, a store, or a building, applies change data through the manager page, registers and authenticates the change data when transferring to a user whose ownership is different, issues a letter of invitation or registers a recommended map according to an owner's request, and provides the invitation and recommended map to a subscriber or a random user; and an interior 460 that registers an interior item, provides an interior to an internal space through the manager page, and applies change data of the interior according to a request from the user terminal, the payment unit 470 may include: a payment system unit 480 that provides payment means and payment recognition means, processes a user's payment request and usage, distributes and stores a payment record, and inspects whether the payment record is polluted; and an accumulation unit that records data accumulation or points provided according to a user's activity and payment in the metaverse game and the registered online and offline member store, business operator, affiliated company, and public institution, and records change details when using the user's accumulated data or points and processes the change details accordingly, the IoT unit 500 may include: an IoT registration unit 510 in which an operator, a business operator, and an affiliated company register programs for each IoT device that connect and link virtual IoT devices with real IoT devices within the metaverse game; an IoT connection and linkage unit 520 that applies the programs through the manager page; and a deepfake unit 530 that registers a character to be replaced with a character appearing in a streaming video provided by the metaverse game and applies the character to the character appearing in the streaming video according to a user's request, the management unit 600 may include: an ownership unit 610 that manages, registers, and applies data of an owner who has purchased a house, an office, a store, or a building, and an owner whose ownership has been transferred from the owner; a user unit 620 that manages, registers, and applies user data such as membership registration information, personal information, authentication information, game information, and payment information; a member store unit 630 that manages, registers, and applies member store data such as membership registration information, member information, authentication information, product and service information, and the sales information; a business operator unit 640 that manages, registers, and applies business operator data such as membership registration information, business operator information, authentication information, operation server information, and provided service information; an affiliate company unit 650 which manages, registers, and applies affiliated company data such as membership registration information, affiliated company information, authentication information, operation server information, and provided service information; a production company unit 660 that manages, registers, and applies production company data such as membership registration information, production company information, authentication information, operation server information, and provided service information; and a public institution unit 670 that manages, registers, and applies public institution data such as membership registration information, public institution information, authentication information, operation server information, and provided service information, the user unit 700 may include: a content registration unit 710 in which content registered by all users is stored by classification; and a search providing unit 720 that searches and provides content stored in the content registration unit by classification according to a request from the user terminal, and the user use unit 800 may include: a hotel unit 810 that registers location information, appearance information, room information, background information, and amount information (hereinafter referred to as "accommodation information"), discloses the accommodation information of the hotel to a user, and provides a hotel accommodation voucher to at least one person according to a request from the user terminal; a landmark unit 820 that registers location information, appearance information, background information, and transportation means information (hereinafter referred to as landmark information), discloses a map and an address of the landmark and the landmark information to the user, and provides services to all connected users according to a request from a random user terminal; a transportation means unit 830 that registers transportation means, discloses the transportation means to the user, and provides the transportation means according to the request from the user terminal; an extreme experience unit 840 that registers location information, background information, extreme information, and extreme means (hereinafter referred to as extreme information), discloses the extreme information to the user, and provides an extreme experience service according to the request from the user terminal; a content unit 850 that is linked with the content server to provide content reservation and registration means through the metaverse game, and is linked to a payment system unit to provide payment means, registers the corresponding details upon payment, and provides means to authenticate and recognize the registration details at an offline site, a database 900, a game DB 910, a background DB 920, a pre-sale unit DB 930, an IoT unit DB 940, a management DB 950, a user unit DB 960, and a user use unit DB 970.

Referring to FIG. 2, the pre-sale information provided by the metaverse system for providing an economic management system to a convergence space in which the real world and a virtual world are converged according to an embodiment of the present invention is provided by an operator, a business operator, an affiliated company, a production company, or a public institution, registers appearance information 413, plan view information 415, and background information 305 based on the operator's pre-sale location 255 and floor area ratio permission, and is composed of pre-sale applications for the user terminal 2 according to an operator's notice. The background information 305 may be a real photo or video that varies depending on a number of floors and a location.

Referring to FIG. 3, as an example in which the user terminal 2 accesses a purchased house, a photo or video of a real background 416 tailored to the location of the avatar or a real background 418 tailored to the viewing angle of the avatar according to the movement of the avatar in the background unit 300 of the metaverse game server 1 is provided after correction according to sound information and real-time weather information. When an avatar opens a window, the sound information may change the outside noise depending on the degree to which the window is open. However, it is provided without background correction during live broadcast.

FIGS. 5 to 15 are detailed configuration diagrams of a manager page of the manager page unit 450 illustrated in FIG. 4 and detailed configuration diagrams of each function of the manager page.

A manager page 4501 provided by the manager page unit 450 may include: a security function 459 implemented upon connection; a decoration function 451 of decorating an internal space; an IoT connection and linkage function 452 between virtual IoT devices and real IoT devices; a function 453 of inviting acquaintances in a messenger and an address book; a function 454 of cleaning a dirty internal space; a function 455 of adjusting brightness of an internal space; a file management function 456 of registering and managing files in all linked IoT devices; a personal information function 457 of registering and managing personal information; and an ownership function 458 of registering an ownership certificate of authentication and an article for sale.

The security function 459 in the manager page 4501 may be a function of allowing the user terminal to go through at least one authentication among quantum communication, a password, biometrics, or pattern recognition as means to access the manager page 4501.

The decoration function 451 in the manager page 4501 may be a function of checking items of the interior 460 for each space based on an internal plan view with a preview, and applying to the internal space when purchasing the items of the interior 460.

The IoT connection and linkage function 452 provided by the IoT connection and linkage unit 510 may connect and link the virtual IoT devices purchased and applied as an item of the interior 460 in the decoration function 451 with the real IoT devices, operate the linked real IoT devices by operating the virtual IoT devices in the metaverse game, and share data by linking the real IoT devices with the virtual IoT devices.

The IoT devices in the manager page 4501 may include a TV 461 that connects and links items of the virtual interior 460 with the real IoT devices and the affiliated company server 3, in which a type and function of the TV 461 may allow watching of video streaming by being linked with the affiliated company server 3 that provides the video streaming from YouTube, Netflix, broadcasters, and media content companies; a game machine 462 on which a game may be played by being linked with the affiliated company server or device that provides game streaming; a running machine 463 and a cycle 464 that may perform recording and accumulation by being linked with the affiliated company server or the device that provides record information; a refrigerator 465 on which storage information may be checked in real time by being linked with the affiliated company server or the device that provides the storage information; a boiler 466 that may control a temperature by being linked with the affiliated company device that provides a temperature control function; a wearable and smartphone 467 that may perform recording and accumulation by being linked with the affiliated company server or the device that provides healthcare measurement information; a desktop, a laptop, a wearable, a tablet, a car computer, and a smartphone 467 that may share data by being linked with the affiliated company server or the device that provides stored data; a bidet that may share data by being linked with a device that analyzes and records health information; a light that may control real-space light or turn it on and off; and an audio 469, a headset, or an earphone through which music streaming may be enjoyed by being linked with the affiliated company server that provides the music streaming.

Among the IoT devices, the TV 461, as one of its functions, combines a character purchased in the item unit 230 with the video streaming provided by the TV or the affiliated company server using the deepfake technology, thereby replacing an appearing character with the purchased character when using the video streaming.

In addition, when adding a sign language item purchased in the item unit 230, an image of a character performing sign language in accordance with sound may be displayed, and when using text content provided by the metaverse game server 1, the business operator server 3, and the affiliated company server 3, if a voice item is purchased from the item unit 230, a service in which the voice reads the text content may be provided.

The invitation 453 in the manager page 4501 supports a method of entering and applying an invitation time and an admission fee in detailed settings 4531 (default time and free when applied without entering) and delivering to at least one of users registered in a messenger or address book window 625 by being automatically executed or by executing a sharing 617 function of a map 615 or address 615 when applied, or a method of entering and applying an invitation time and an admission fee (default time and free when applied without entering) and allowing the manager page unit 450 to issue a letter of invitation (4537) or register a recommended map (4539) and provide the letter of invitation and recommended map to subscribers and random users.

The cleaning 454 in the manager page 4501 may be a function for cleaning (4542) an internal space 4541 that has become dirty according to the number of days without a visit from an owner.

The brightness adjustment 455 in the manager page 4501 is a function of adjusting light intensity in the internal space (4551), and may be a function of applying in response to darkness when night comes according to real time (4552).

The file management function 456 in the manager page 4501 may be a function of selecting and registering stored files of all IoT devices linked through the IoT connection and linkage function 452 (715), using the registered files in the item of the interior 460 by being linked with the item of the interior 460, and managing the registered files.

The personal information function 457 in the manager page 4501 may support a function of registering and correcting basic information on a profile, a contact, and an address (real), registering and correcting various certificates and certificates of authentication by being linked with the public institution server 3, the affiliated company server 3, the business operator server 3, and IoT devices, registering and correcting payment means by being connected to the payment system server 3, and registering and deleting one's health data by being linked with the healthcare server 3 and a healthcare device among the IoT devices.

The ownership function 458 in the manager page 4501 may be a function of storing the block-chained, encrypted, or NFT-ized ownership file or token, entering the amount, registering the article for sale (4581), and transferring ownership to the other party when the sale is completed (4582).

FIG. 16 is a diagram illustrating a main screen configuration of a user terminal.

Referring to FIG. 16, executing the user terminal 2 includes a function of displaying search 725, favorite apps 795, and recommended apps 707 that may search all content of the metaverse game server 1 provided by the user unit 700, and finding and registering content in the user terminal 2 device or content in an IoT device linked to the user terminal 2 (715).

FIG. 17 is an exemplary diagram for a use of digital currency.

Referring to FIG. 17, when purchasing metaverse game content from the user terminal 2 using digital currency among the payment means provided by the payment unit 470 of the metaverse game server 1, the distribution target and distribution rate are recorded in the digital currency recording area along with the transaction details 471, 473, and 475, and the payment system unit 480 performs automatic distribution at a distribution rate to distribution targets 471, 473, and 475 according to the digital currency record.

FIGS. 18 to 24 are exemplary diagrams for describing a use of a user use unit illustrated in FIG. 4.

Figure 18:
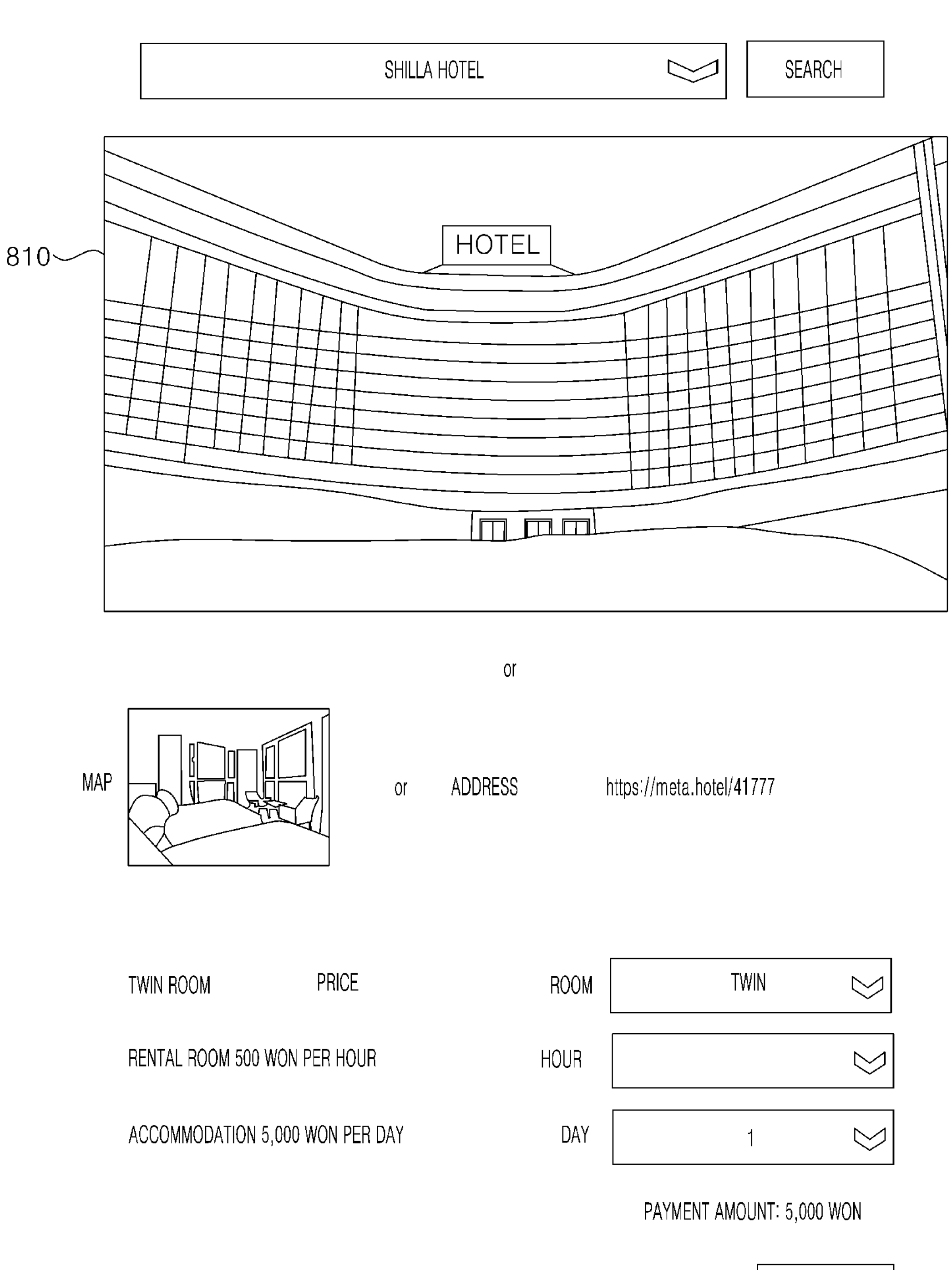

Referring to FIG. 18, as hotel accommodation content provided by the hotel unit 810 to the user terminal 2, a room type and a corresponding usage time input window are provided to the user terminal, and when payment is made for the amount automatically calculated according to the input of the user terminal, an accommodation voucher is provided to the user terminal, and the number of invitees may be limited according to the room type.

Figure 19:
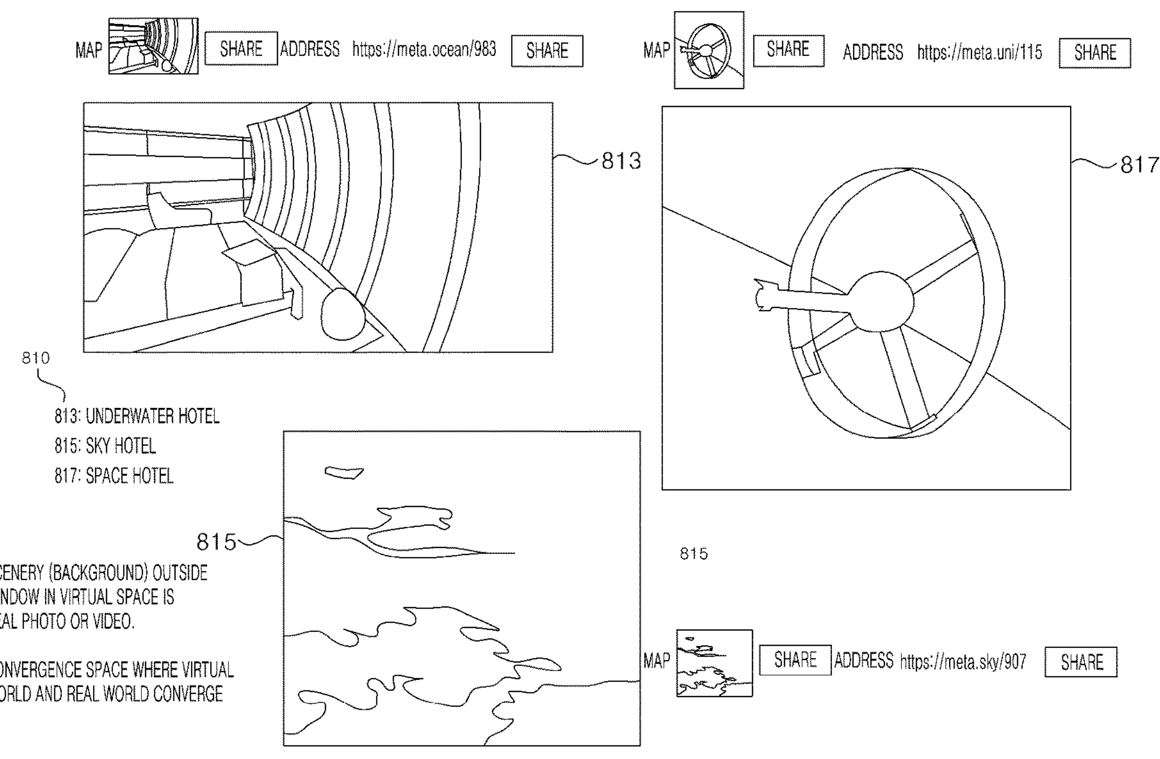

FIG. 19 is an exemplary diagram for describing an implementation example of the hotel unit 810 illustrated in FIG. 4.

Referring to FIG. 19, as the hotel accommodation content provided by the hotel unit 810 to the user terminal 2, an underwater hotel 813, a sky hotel 815, and a space hotel 817 are provided. In this way, the metaverse game server may provide services that are impossible with current science and technology by providing a convergence space in which the real world and a virtual world converge.

Figure 20:
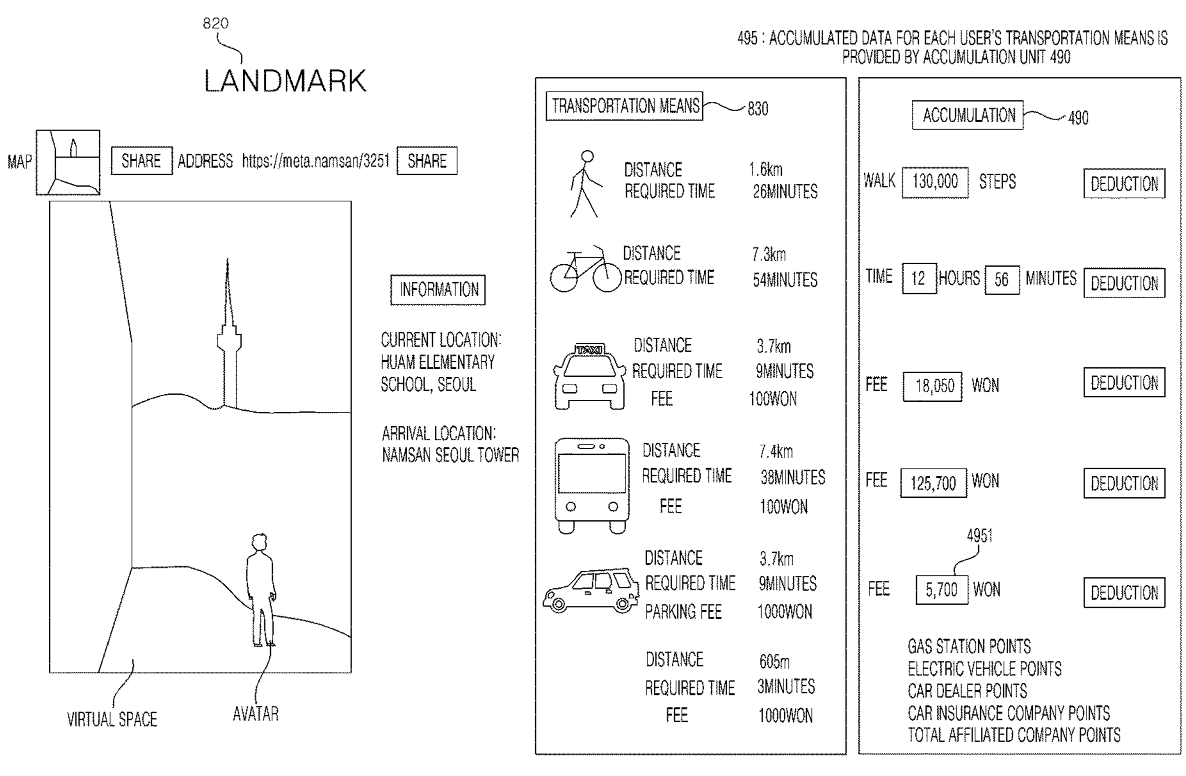

FIG. 20 is an exemplary diagram for describing an implementation example of the landmark unit 820 illustrated in FIG. 4.

Referring to FIG. 20, the game method linked with the landmark unit as the landmark visit content provided by the landmark unit 820 to the user terminal 2 locates a user's avatar at an entrance of a landmark when accessing a map or an address of the landmark on the user terminal, and moves the user's avatar from the entrance of the landmark to the landmark providing background information through a virtual transportation means provided by the transportation means unit 830, and may provide a program that deducts the user's accumulated data or points through the accumulation unit 490.

Among the above transportation methods, for a car, points may be accumulated (4951) by purchasing car-related products such as use of a gas station, charging of an electric vehicle, or a car dealer or a car insurance company, for a bus, points may be accumulated with real bus usage records, for a taxi, points may be accumulated with real taxi usage records, for a bicycle, points may be accumulated with records linked to a bicycle among IoT devices, and for walking, points may be accumulated with records linked to a wearable or smartphone healthcare function among IoT devices.

Figure 21:
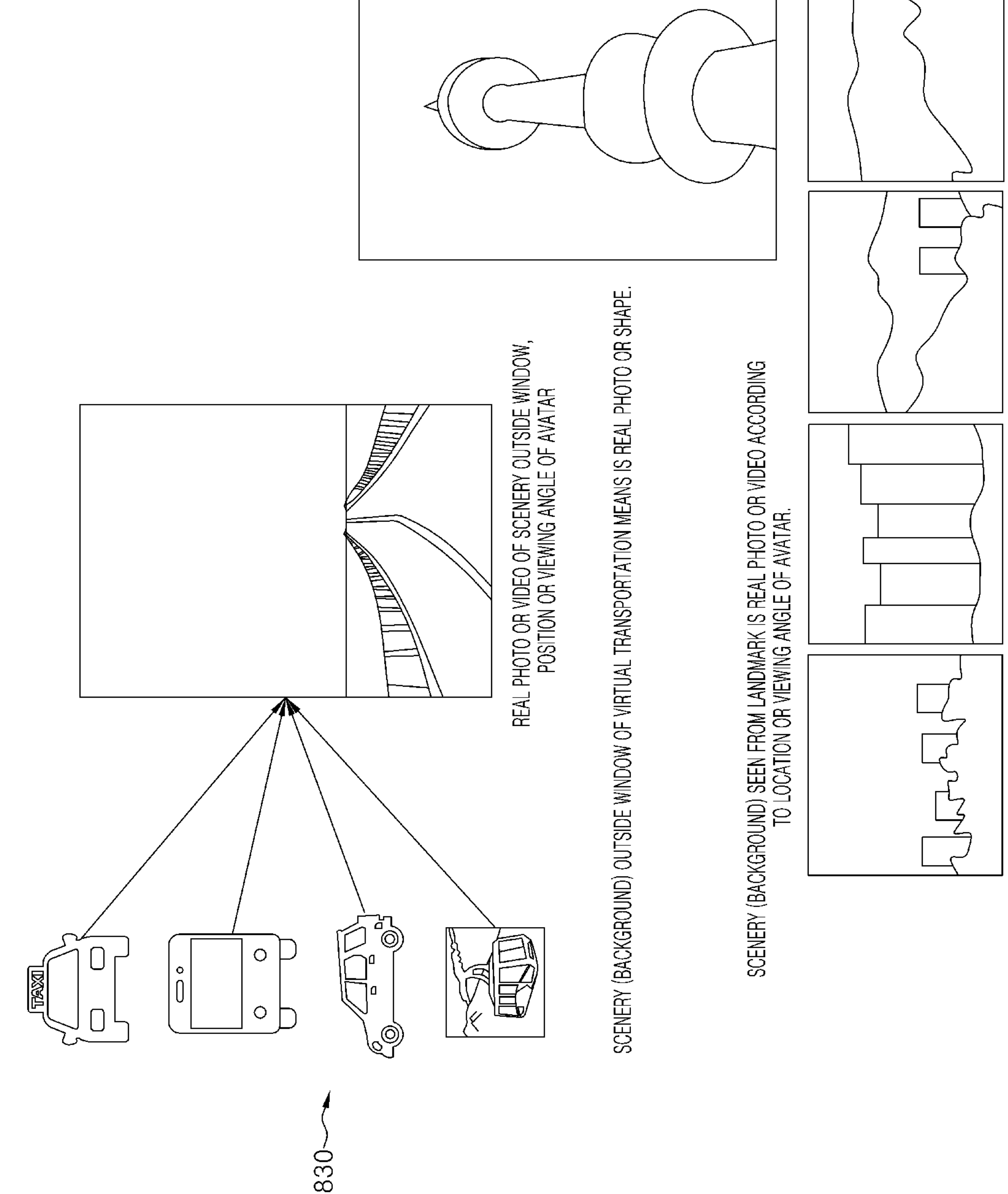

FIG. 21 is an exemplary diagram for describing an implementation example of the transportation means unit 830 illustrated in FIG. 4.

Among the virtual transportation means provided by the transportation means unit 830, means requiring power (taxi, bus, car, cable car, tram) may provide background information (real photo or video) outside a window while the user's avatar is moving.

The virtual transportation means provided by the transportation means unit 830 is not limited to these transportation means and may apply all transportation means that actually exist (for example, airplane, helicopter, ship, spacecraft, submarine, high speed rail, etc.).

Figure 22:
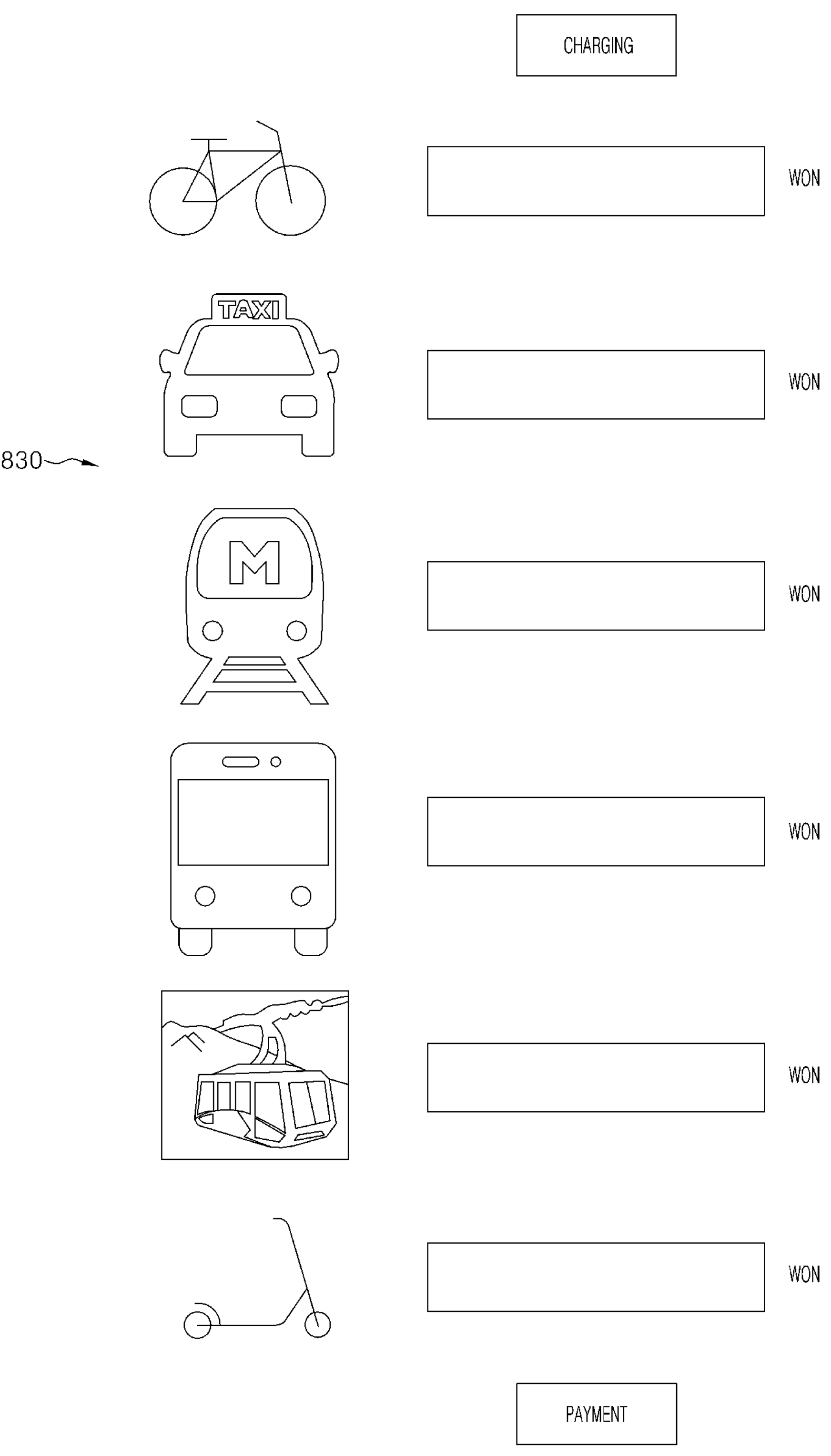

FIG. 22 is an exemplary diagram for describing an implementation example of the transportation means unit 830 illustrated in FIG. 4.

The transportation means unit 830 may provide prepaid charging means that may charge a fare of real transportation means (airplane, helicopter, ship, spacecraft, submarine, high speed rail, bus, taxi, subway, tram, bicycle, kickboard, cable car, zipline) through the virtual transportation means according to the request from the user terminal 2, and may be used for the real transportation means by being linked with the user's registered payment means when charging.

Figure 23:
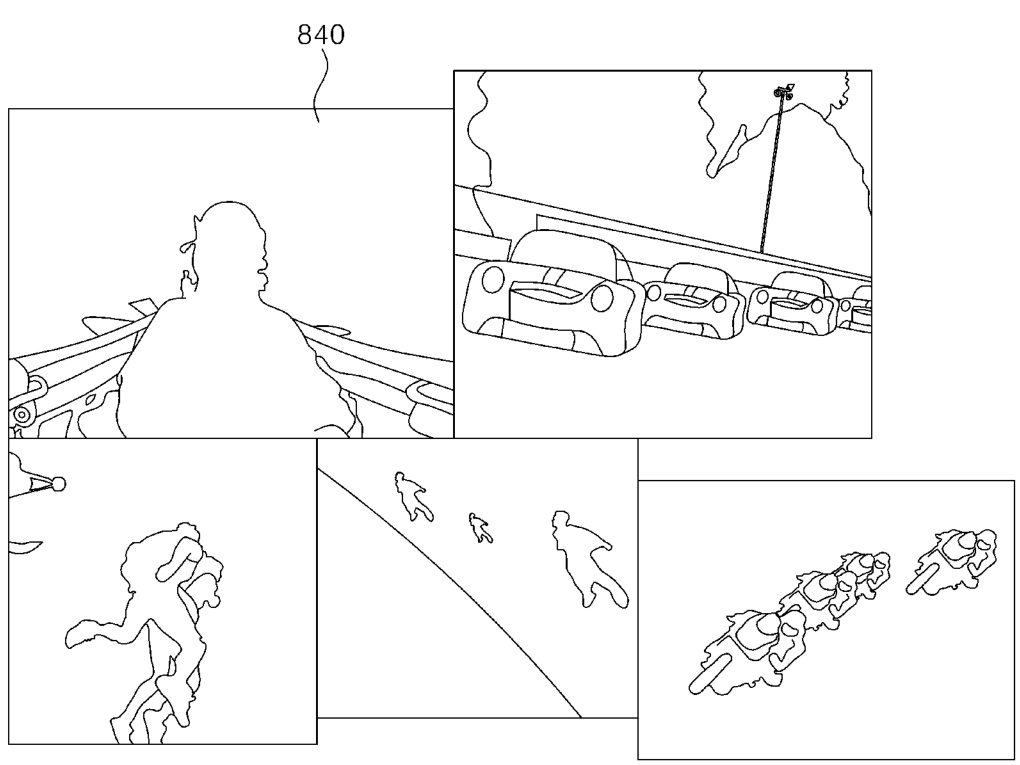

FIG. 23 is an exemplary diagram for describing an implementation example of the extreme experience unit 840 illustrated in FIG. 4.

Referring to FIG. 23, the extreme experience unit 840 provides real background information while using extreme experience content on the user terminal 2.

FIG. 24 is an exemplary diagram for describing an implementation example of the content unit 850 illustrated in FIG. 4.

Referring to FIG. 24, the content unit 850 provides content reservation and registration means through the metaverse game according to the request from the user terminal 2, provides the payment means by being linked with the payment system unit, registers the corresponding details upon payment 855, and provides means for authenticating and recognizing the registration details at an offline site 857.

FIG. 25 is an exemplary diagram for describing an implementation example of the virtual reality conversion unit 350 illustrated in FIG. 4.

Referring to FIG. 25, when a real photo or video is registered on the user terminal 2, the virtual reality conversion unit 350 classifies products in a photo by type, converts the products into selectable virtual graphics, and provides the graphics to the metaverse system 100.

FIGS. 26 and 27 are exemplary diagrams for describing an implementation example of the purchase unit 860 illustrated in FIG. 4, and FIG. 26 is an exemplary diagram for describing an implementation example of the purchase unit 860 illustrated in FIG. 4.

Referring to FIG. 26, the purchase unit 860 provides sales information and purchase means 355 according to the request 725 of the user terminal 2, and is divided into one of two methods: a method of performing a delivery purchase with a set delivery time or a method of performing a visit purchase by entering a visit time, according to the selection of the user terminal 2.

FIG. 27 illustrates the real-time delivery location 257 on the metaverse system 100 by linkage with the location-based service unit 250 when paying for the delivery purchase among the purchase methods provided in FIG. 26.

FIG. 28 is an exemplary diagram for describing an implementation example of the location-based service unit 250 illustrated in FIG. 4.

Meanwhile, the metaverse game server 1 may be configured to create and provide electronic documents created or generated according to exchange, sharing, and commercial transaction actions that occur within the convergence space, and request processing for the electronic document to be issued by the public institution that issues the electronic documents.

In addition, the metaverse game server 1 may be configured to adjust the movement of the virtual object so that the virtual object is operated by the operation of the real object within the convergence space. The adjustment method may be provided according to the device characteristics of the user terminal 2.

For example, among the wearable devices, a device that is put on, attached to, or worn on the human body may adjust the virtual object to operate and move within the convergence space by the operation and movement of the real object using the wearable. Alternatively, the virtual object may be adjusted to operate and move within the convergence space using brain waves of a real object using a wearable device.

The metaverse game server 1 may be linked with a healthcare system linked with the user terminal 6, and may be configured to apply the user's movement measured by the healthcare system to the movement of an avatar located within the convergence space.

Here, the metaverse system 100 for providing an economic management system to a convergence space in which the real world and a virtual world are converged as described herein operates by the following metaverse game service and game operation method.

The metaverse game server or the business operator terminal sets a floor area ratio for a specific area based on the real map, creates one of the building or house designs produced directly by an operator or provided by a production company and a business operator, registers indoor interior items and photos or videos taken at real locations, or links real-time videos and then issues a pre-sale announcement (text, SNS, notice, video, bulletin board, advertisement, etc.) to random users.

A user who has completed payment due to the completion of pre-sale is granted ownership (blockchain or encryption or NFT) and a house address link or a map provided by the metaverse game server or the production company terminal and the business operator terminal, and accesses a house through the corresponding link or map.

A user who becomes a house owner may set security measures (quantum communication, a password, pattern recognition, biometrics, etc.) to prevent other users from accessing the house through a link or a map, access a manager page to set and apply (apply after payment when setting up paid items other than free items) interior items (floor material, wallpaper, picture frame, mirror, bidet, bathtub, light 1, light 2, light 3, desk, bookcase, sofa, TV, CCTV, audio, computer, boiler, thermostat, air conditioner, refrigerator, washing machine, dryer, gas range, rice cooker, kitchen, sink, induction, microwave, treadmill, bicycle, etc.) in each frame (room 1, room 2, room 3, bathroom 1, bathroom 2, living room floor and wall, ceiling, window, kitchen, etc.) for each indoor area depending on square feet, and then check the interior to which the indoor interior items have been applied.

By linking the metaverse game with the real Internet of Things (IoT) devices, when a light, a TV, a CCTV, an audio, a computer, a boiler, a thermostat, an air conditioner, a refrigerator, a washing machine, a dryer, a rice cooker, etc., are activated in the metaverse game, the Internet of Things (IoT) device may actually operate.

For example, food recommendations and subscription services of a member store or an affiliated company may be provided depending on the increase or decrease in food in a refrigerator. As another example, by linking the TV in the metaverse game with the real TV channel, a user may watch the real TV through the metaverse game and receive distribution of related advertising revenue, or use services by paying fees to business operators, who provide content, such as TV replays. Then, when a user purchases a character and combines the character with a TV or video character (using deepfake technology in the deepfake unit 530 of the metaverse game server), the user may watch programs such as weather, news, and entertainment introduced by his/her desired character. In addition, when a visually impaired user uses a text platform provided by a business operator or an affiliated company after purchasing a voice, a service where the purchased voice reads the selected text may also be provided.

In addition, recorded information measured from health management devices such as a treadmill, a bicycle, healthcare in a smartphone, and a pedometer in a smartwatch is transmitted, allowing a user to move in the metaverse game according to the recorded information.

For example, a user may not watch a video of a cityscape seen from a real landmark (e.g., Namsan) by immediately moving to the Namsan Tower coordinates (link or map) in the metaverse game, and may watch the video of the cityscape only after reaching the summit on foot, by bicycle, by public transportation, or by cable car from the entrance to Namsan within the metaverse game, which may immediately move via an address link or a map. In this case, a user may immediately move according to recorded information measured from the health management device.

In addition, even when the user moves on the virtual transportation means within the metaverse game, the real scenery outside the window is seen by being adjusted according to the location or viewing angle of the user's avatar.

The metaverse game takes place in a virtual space, but by combining a real photo and a video and providing a user with the combined photo and video, the user may feel as if he/she is actually traveling anywhere.

An operator, a business operator and an affiliated company may create various experience products with realistic visual and auditory effects and provide the experience products in the metaverse game. Examples of the experience products may include fighter jet rowing, F1 Grand Prix, motorcycle racing, cycle racing, skydiving, wingsuit flying, surfing, and undersea exploration.

A user may invite other users to a house which he/she owns, which is performed by selecting people from a list of people registered in the user terminal application and inviting them, and may set and transmit a visit date and time along with the address link or map, and the invited users may only stay for the time and duration set by the owner (crash or error when time runs out).

Meanwhile, when data fragmentation occurs due to frequent data processing of a user, unused data is accumulated, or an owner does not visit a house, dust, mold, etc., accumulated in every corner of a room are marked as foreign matters. When an owner executes a "cleaning" function, functions such as defragmentation, organizing unused data, and reusing a house are executed, and the mark of the foreign matters gradually disappears.

A user may transfer ownership of his/her house to other users. When the owner transfers ownership through a manager page ownership function 4582, the method provides a house deed (blockchain, encryption, or NFT) and a house address link or map to a transaction target after disabling security measures (quantum communication, a password, pattern recognition, biometrics, etc.). A new owner may be granted rights to a rights holder page to register security measures (quantum communication, a password, pattern recognition, biometrics, etc.). A new owner may apply the indoor interior of the house registered by the existing owner as it is or partially correct or reset the indoor interior. During the transaction process, payment for rights transfer is made through escrow provided by the payment system server.

The above description is an example of a house, and the pre-sale and convergence space for an office, a store, and a building are provided with appropriate adjustments.

When something is stored at a member store through a member store terminal in an offline store, a location (branch) of a real store is reflected in a metaverse game, and when a user who participates in a game visits a member store and selects a product, sets a reservation time and whether to deliver, and makes payment, a transaction is made by preparing and delivering the product according to the reservation time at a real offline store (checking a delivery status in real time in the metaverse game) or by delivering the product after authentication when the user visits.

The member store must display products and display prices in the member store within the metaverse game. For this, when the photo or video displayed in the real store at the member store terminal is taken and registered, in the virtual reality conversion unit 350 of the metaverse game server, different types of photos or videos are converted into a state where they may be displayed and selected.

When the member store is a restaurant or has a small number of products, a user may enter and register product photos, videos, and prices one by one.

A user may find the member store of the desired category by specifying a current location or a specific location in the metaverse game and searching using search words, voice recognition, or the like, and may place an order by selecting a menu from the member store within the metaverse game and paying for the selected menu even when visiting an offline member store in real life. The member store may provide discounts and savings benefits for purchasing products or services at the member store terminal to be used for marketing such as informing subscribed users or attracting new users.

In addition, based on the search and location-based service, a user may use the discounts and savings benefits for the used transaction.

A user, a business operator, and an affiliated company rent and pay for cultural facilities such as an amusement park, a performance hall, a movie theater, a banquet hall, an art hall, an exhibition hall, a gym, a wedding hall, a music hall, and a museum created in the metaverse game, and are granted an address (link or map) and manager page permission to attract users.

According to the method, a user, a business operator, or an affiliated company who is an owner enters and applies the invitation time and admission fee in the detailed settings 4531 of the invitation 453 function in the manager page 4501 (default time and free when applied without entering), and the metaverse game server supports a method of issuing a letter of invitation (4537) or registering a recommended map (4539) in the manager page unit 450 and providing the letter of invitation or recommended map to subscribers and random users according to the request from the user, the business operator, or the affiliated company who is an owner.

For example, a user, a business operator, or an affiliated company who owns real artifacts but is worried about not being able to afford to build a real museum may implement commercialization by renting a museum within the metaverse game and exhibiting photos or videos of the real artifacts to attract paying users or convert the artifacts into NFTs and sell the NFT-ized artifacts to users.

The business operator, the member store, and the affiliated company may create buildings in the metaverse game or store them at existing buildings and attract users by the operator permission.

For example, users playing the metaverse game should make an appointment at Starbucks, which is an affiliated company, and pay an entrance fee or a virtual food fee when accessing the link or the map, and when paying with digital currency among the payment means, the digital currency payment amount is automatically distributed according to the distribution rate set by Starbucks, which is an affiliated company, and an operator.

When domestic users use overseas content from an overseas business operator or an overseas affiliated company, costs are incurred as they are linked with an overseas metaverse game server and an overseas payment system server through a domestic game operation server and a domestic payment system server.

For example, when a domestic user visits France's Louvre museum in a metaverse game operated by an overseas game operation server, a server linkage fee may be added to the admission fee, and when paying with digital currency, all distribution targets may receive real-time distribution.

Developers may expand a usage area by adding application programs to game operation servers and applications, and real-time profit distribution may occur according to users' usage performance.

The present invention is not limited by the above-described embodiments and the accompanying drawings. It will be obvious to those skilled in the art to which the present invention pertains that components according to the present invention can be replaced, modified, and changed without departing from the technical spirit of the present invention.

DESCRIPTION OF REFERENCE SIGNS

100: Metaverse system for providing economic management system in convergence space where real world and virtual world converge 1: Metaverse game server 2: User terminal 3: Payment system server, affiliated company server, business operator server, healthcare server, member store server

The invention claimed is:

1. A metaverse system for providing an economic management system to a convergence space in which the real world and a virtual world are converged, the metaverse system comprising:

a user terminal configured to execute a metaverse game that supports an avatar configured by a user and a convergence economy service, by which an economic activity is performed in a convergence space in which a virtual world where the avatar is active and the real world converge; and a metaverse game server configured to provide information accompanying movement and a transaction of the avatar within the metaverse game space as convergence information obtained through the convergence of the virtual world and the real world, and provide a metaverse game in which a result according to a transaction action of the avatar is reflected in a convergence economy, wherein the metaverse game server supports a management function of allowing a transaction action between avatars for a pre-sale, ownership acquisition, a sale, and a purchase of a house, a store, an office, and a building in which the real world and the virtual world converge in the metaverse game space to be treated as a real transaction action between users in the real world, and managing information related to the pre-sale, the ownership acquisition, the sale, and the purchase.

2. The metaverse system of claim 1, wherein the metaverse game server collects a location and viewpoint of the avatar located in the virtual space, and viewpoint information at a real place, a real background, and a real location corresponding to the location and time of the avatar from a drone, a camera, a plurality of Internet of Things (IoT) devices, an external terminal, or an external server.

3. The metaverse system of claim 2, wherein the metaverse game server supports applying the location of the avatar over time and an image, a real video, and/or a real-time video taken at the real place, the real background, and the real location corresponding to the location and viewpoint of the avatar to a pre-sale, a game, and a product supported in background information of the avatar and a metaverse game space, and adjusting movement of a virtual object so that the virtual object operates with an operation of a real object in the convergence space.

4. The metaverse system of claim 1, wherein the metaverse game server reflects sound information and real-time weather information in a real photo or video registered in the metaverse game space.

5. A metaverse system for providing an economic management system to a convergence space in which the real world and a virtual world are converged, the metaverse system comprising:

a user terminal configured to execute a metaverse game that supports an avatar configured by a user and a convergence economy service, by which an economic activity is performed in a convergence space in which a virtual world where the avatar is active and the real world converge; and a metaverse game server configured to provide information accompanying movement and a transaction of the avatar within the metaverse game space as convergence information obtained through the convergence of the virtual world and the real world, and provide a metaverse game in which a result according to a transaction action of the avatar is reflected in a convergence economy, wherein the metaverse game server supports a service for registering and correcting basic information on a profile, a contact, and an address (real), registering and correcting various certificates and certificates of authentication by being linked with a public institution server, an affiliated company server, a business operator server, and IoT devices, registering and correcting payment means by being connected to a payment system server, and registering and deleting health data by being linked with a healthcare server and a healthcare device among the IoT devices.

6. The metaverse system of claim 1, wherein the metaverse game server stores a block-chained, encrypted, or non fungible token (NFT)-ized ownership file or token, and supports a service for transferring ownership to the another user when a sale is completed by registering an article for sale after entering an amount.

7. The metaverse system of claim 1, wherein the metaverse game server is linked with a payment system that supports, as transaction means performed in the metaverse game space, any one of in-app payment, digital currency, cryptocurrency, bank transfer through a bank, a credit card, a value added network (VAN), a payment gateway (PG), simple payment, and a gift certificate.

8. The metaverse system of claim 7, wherein, when paying with the digital currency among the payment means of the payment system, a distribution target and a distribution rate are recorded in a digital currency record area along with transaction details, and the payment system performs an automatic distribution to the distribution target at the distribution rate according to the digital currency record.

9. The metaverse system of claim 8, wherein the payment system records accumulated data or points provided according to a user's activity and payment in the metaverse game and an online or offline member store, a business operator, an affiliated company, and a public institution where a member is registered, and records and processes a change history when using the user's accumulated data or points.

10. The metaverse system of claim 1, wherein the metaverse game server supports a service for connecting and linking virtual IoT devices in the metaverse game with real IoT devices.

11. The metaverse system of claim 10, wherein the metaverse game server registers a character to be replaced with a character appearing in a streaming video, which are provided by the metaverse game, and applies the character to the character appearing in the streaming video according to a user's request.

12. The metaverse system of claim 1, wherein the metaverse game server supports an experience service of experiencing an accommodation, a landmark, transportation means, and sports in the metaverse game space.

13. The metaverse system of claim 12, wherein, in a case of the transportation means, the metaverse game server provides background information (a real photo or video) outside a window while a user's avatar moves.

14. A metaverse system for providing an economic management system to a convergence space in which the real world and a virtual world are converged, the metaverse system comprising:

a user terminal configured to execute a metaverse game that supports an avatar configured by a user and a convergence economy service, by which an economic activity is performed in a convergence space in which a virtual world where the avatar is active and the real world converge; and a metaverse game server configured to provide information accompanying movement and a transaction of the avatar within the metaverse game space as convergence information obtained through the convergence of the virtual world and the real world, and provide a metaverse game in which a result according to a transaction action of the avatar is reflected in a convergence economy, wherein the metaverse game server is further connected to a healthcare server, a member store server, a business operator server, a public institution server, and an affiliated company server (hereinafter referred to as content servers), and is linked with the content servers to provide content reservation and registration means, payment means, authentication means, and recognition means along with providing the content through the metaverse game.

15. The metaverse system of claim 14, wherein the user, the business operator, and the affiliated company apply an invitation time and an admission fee to issue a letter of invitation or register a recommended map in the metaverse game server, and the metaverse game server provides the registered letter of invitation or recommended map to a subscriber and a random user.

16. The metaverse system of claim 14, wherein the metaverse game server registers sales information, discloses the sales information and provides the disclosed sales information to a user who has applied for subscription, provides the payment means by being linked with the payment system, registers corresponding details upon payment, and transmits the registered details to a seller.

17. The metaverse system of claim 16, wherein the metaverse game server supports an electronic transaction service for purchasing, paying for, and delivering a real product at a store in the metaverse game, and when delivering and purchasing, a real-time delivery location is confirmed in the metaverse game, a current location of the user terminal is determined, and local member store information is provided.

18. The metaverse system of claim 17, wherein the metaverse game server provides payment means and payment recognition means through the payment system, or provides a program for deducting accumulated data or points of the user through an accumulation unit when using content within the user's metaverse game and making payments at the offline member store, the business operator, the affiliated company, and the public institution where members are registered.

19. The metaverse system of claim 1, wherein the metaverse game server provides prepaid charging means that charges a fee of real transportation means through virtual transportation means, and is linked with the registered payment means of the user when charging and applied to the real transportation means.

* * * * *